United States Patent [19]
Komatsuda

[11] Patent Number: 5,390,224
[45] Date of Patent: Feb. 14, 1995

[54] CLOCK CONTROL APPARATUS

[75] Inventor: Hiroshi Komatsuda, Kawasaki, Japan

[73] Assignee: Fujitsu Limited, Kawasaki, Japan

[21] Appl. No.: 118,248

[22] Filed: Sep. 9, 1993

[30] Foreign Application Priority Data

Dec. 23, 1992 [JP] Japan .................................. 4-356926

[51] Int. Cl.⁶ .......................................... H03K 21/08
[52] U.S. Cl. ........................................ 377/56; 377/78;
327/291; 327/292; 327/113; 327/392
[58] Field of Search ............... 307/269, 510, 518, 271,
307/592; 328/63, 109; 372/56, 78

[56] References Cited

U.S. PATENT DOCUMENTS

| | | | |
|---|---|---|---|
| 4,302,818 | 11/1981 | Niemann | 364/736 |
| 4,378,589 | 3/1983 | Finnegan et al. | 364/200 |
| 4,507,732 | 3/1985 | Catiller et al. | 364/200 |
| 4,849,702 | 7/1989 | West et al. | 307/269 |
| 4,922,414 | 5/1990 | Holloway et al. | 364/200 |
| 5,146,585 | 9/1992 | Smith, III | 307/269 |

*Primary Examiner*—Margaret Rose Wambach
*Attorney, Agent, or Firm*—Staas & Halsey

[57] ABSTRACT

A clock control apparatus having a basic period clock and a plurality of clocks with different phases from the basic period clock by t/N period, is used with an information processing unit. The apparatus comprising a clock signal generating portion for generating pulses of the basic period clock, a cycle counter for counting the number of pulses of the basic period clock received from the clock signal generating portion when a start command is received and for outputting a cycle counter clock stop signal when the number of pulses becomes a predetermined count value, a control portion for outputting a basic enable period signal for controlling the basic period clock and a delay enable period signal for controlling the t/N period clocks by a flag and the cycle counter clock stop signal, the flag being assignable before the start command is received, a basic period clock enabling portion for receiving pulses of the basic period clock and for outputting the pulses of the basic period clock for a period designated by the basic enable period signal, and a t/N delay period clock enabling portion for generating pulses of the t/N period clocks and for outputting the pulses for a period designated by the delay enable period signal.

17 Claims, 19 Drawing Sheets

CLOCK CONTROL APPARATUS

BACKGROUND OF THE INVENTION

1. Field of the Invention

The present invention relates to an information processing apparatus which is operated by a clock with a predetermined frequency, in particular to a clock control apparatus for controlling a clock of a cycle counter which stops an information processing apparatus using a plurality of clocks with different phases (for example, using a plurality of clocks with different phases which are internally or externally generated from a basic clock, a CPU (Central Processing Unit) can be internally operated by a clock with a frequency several times higher than the frequency of the basic clock).

2. Description of the Related Art

In developing an information processing unit which performs a pipeline process or the like, the unit should be effectively tested.

FIG. 1 is a schematic diagram for explaining the operation of a pipeline processing unit. As shown in the figure, the pipe line processing unit operates corresponding to commands in a pipeline. When a unit is developed, processes of commands are tested in time sequence.

In the figure, the pipeline processing unit executes commands C1 to C4 as they are. An error E1 (for example, a parity error) takes place in a process system which executes a command C5. When the error E1 takes place, a test unit stores the error information (E5) and sends it to an error analysis system (E2).

The error analysis system (E3) categorizes the received error information as several levels (such as a recoverable error, and a fatal error which results in the system going down). On receipt of the error information, the error analysis system causes all clocks to be stopped (E4).

In the example shown in FIG. 1, when all clocks are stopped (namely, at a command C13), the pipeline processing unit stops. While the command C5 was being processed, an error took place. Thus, just after that, all clocks of the unit should be stopped and the state before the command C5 has been processed should be held. However, as shown in FIG. 1, after a process for an error is performed, all clocks are stopped. Since several commands are executed during this period, process information of the command C5 is replaced with the subsequent command. Thus, the process information of the command C5 is lost.

In this case, a function which can immediately save process information of a command which caused an error to a register or the like is desired. However, if such a function were employed in the entire unit, the circuit scale would remarkably increase. To solve such a problem, a technique which uses a cycle counter is known. Next, the technique using the cycle counter will be described.

FIG. 2 is a schematic diagram for explaining a conventional cycle counter.

If the user cannot know at what command counted from the command start time an error took place, a particular value is loaded to the cycle counter. Then, commands are executed from the command start time and the cycle counter is started. As in the case shown in FIG. 2, "8" is loaded to the cycle counter. When all clocks are stopped (namely, the value of the cycle counter becomes zero), the unit checks whether or not error information is saved.

In the example shown in FIG. 2, since an error has taken place, a reset signal is issued to the unit. Thereafter, a value smaller than the last value is loaded to the cycle counter. For example, in the case shown in FIG. 2, "7" is loaded to the cycle counter. The same commands are reexecuted from the command start time and the cycle counter is started. Likewise, the unit checks whether or not error information is saved. These steps are repeated.

If a command which caused an error is known, it is not necessary to repeat such steps. In the example shown in FIG. 2, when "4" is loaded to the cycle counter, since no error takes place, it is found that the error took place in the command C5.

When the processing state of a command which caused an error can be saved with the above-described steps, the cause of the error is determined corresponding to the processing state.

FIG. 3 is a circuit diagram showing the construction of a conventional cycle counter. For the sake of simplicity, it is assumed that the cycle counter operates with a basic period clock t and a t/2 period clock.

FIG. 4 is a timing chart of signals in the conventional cycle counter. In the figure, units FF3 and FF4 to be tested are counters. The numbers of clock pulses of these under-test devices FF3 and FF4 are counted.

Next, the clock control by the conventional cycle counters will be described.

Before using the cycle counters, values with which clocks are stopped should be set. In the example shown in FIG. 3, with an external clock stop command m6, the basic period clock is stopped. The external clock stop command m6 is issued by the user, a machine check of the unit, or the CPU when any command is executed.

With the external clock stop command m6, at time a shown in FIG. 4, a flip-flop FF1 which stops the clock is set. By a gate G1, the basic period clock signal m1 which is output from a signal generator SG is suppressed while the flip-flop FF1 is being set (clock signal m12). In other words, when the flip-flop FF1 is set, a clock stop signal m2 becomes high ("1"), thereby turning off the gate G1 which is a NOR circuit. Thus, the output of the gate G1 becomes low.

The clock signal m12 is supplied to a gate delay circuit DL1 (such as a delay line which adds a predetermined delay period of time). In addition, the clock signal m12 is supplied to a NOR gate G3 and an inverter G2. A clock signal m4 which is the output of the gate delay circuit DL1 has a phase of t/2. For example, when the basic period is 20 ns, the phase of the clock signal m4 is 10 ns later than the clock signal m12. Thus, when the clock signal m4 is suppressed with the clock stop signal, it is stopped 10 ns later than the clock m12.

The counter FF3 which is a unit to be tested uses a clock signal m3. While the clock signal m3 is being suppressed, the counter FF3 stops. On the other hand, the counter FF4 uses a clock signal m3. The clock signal m5 is an OR result of the clock signal m12 and a clock signal m4 which is the output of the gate delay circuit DL1. The clock signal m5 is a clock signal with a period of ½t. Thus, the counter FF4 stops 10 ns later than the counter FF3 (at the time as shown in FIG. 4, the clock signal m3 which is supplied to the counter FF3 is stopped, whereas the clock signal m5 supplied to the counter FF4 is stopped one pulse later than the time a).

A cycle counter CYL comprises a flip-flop FF8 (which stores a count start command), a latch FF9, a decrementer D-1, a selector SEL1, and a decoder DEC. The output of the latch FF9 is connected to the input of the latch FF9 through the decrementer D-1 and the selector SEL1. When the selector SEL1 selects the output of the decrementer D-1, whenever the latch FF9 receives a fetch clock pulse, the value of the latch FF9 decrements by 1.

When the supplies of clock pulses to the FF3 and FF4 are stopped, predetermined data is selected by the selector SEL1. For example, cyclic value "5" is loaded to the latch FF9 of the cycle counter. Then, a start command m7 is input. Thereafter, the output of the decrementer D-1 is selected by the selector SEL1.

When the start command m7 becomes high ("1"), at time b (shown in FIG. 4), the flip-flop FF8 is set. A cycle counter enable signal m8 which is the output of the flip-flop FF8 becomes high. Thus, the cycle counter CYL starts a decrement operation. In addition, the clock stop flip-flop FF1 is reset and thereby the output m2 thereof becomes low. Thus, the gate G1 is turned on and thereby supplying the basic period clock signal m1.

With the above-described start command m7, the clock signals m3 and m5 which were stopped are supplied to the counters FF3 and FF4. Thus, the counters FF3 and FF4 of the under-test unit count their clock pulses. The counter FF3 of the under-test unit operates with the basic period (20 ns) clock signal. On the other hand, the counter FF4 operates with a t/2 period (10 ns) clock signal which is an OR result of the basic period clock signal (20 ns) and the output of the gate delay circuit DL1 which is later by 10 ns than the basic period clock signal. In other words, the counter FF4 performs a count operation at a speed twice as faster as that of the counter FF3.

When the latch FF9 of the cycle counter CYL becomes high ("1") at the time c (shown in FIG. 4), the decoder DEC adds a decode value "1" to the clock stop detecting circuit CSK. The clock stop detection circuit CSK causes the clock stop signal m10 to become high ("1"). With the high ("1") state of the clock stop signal m10, the clock stop flip-flop FF1 is set again thereby turning off the gate G1. Thus, the gate G1 suppresses the supply of the clock signal m1 and thereby stops the supplies of the clock signals m3 and m5.

At the same time, the cycle counter CYL becomes "0" and stops. The counter FF3 becomes "5" and stops. The counter FF4 becomes "10" and stops.

With the above-described operation of the cycle counter, the operation of the unit can be stopped at a desired position so as to obtain the state of an occurrence of an error.

However, since the cycle counter CYL counts cycles of the basic period clock signal (20 ns), the count value of the counter FF4 of the under-test unit becomes always twice the count value of the counter FF3. Thus, when there is a need to stop the counter FF4 at an odd number, even with an attempt to stop the supply of the clock signals with the cycle counter CYL, the counter FF4 stops at an even number. When the value of the counter FF4 is an odd number, the supplies of the clock signals cannot be stopped. Instead, after receiving one pulse of the t/2 period clock (10 ns), the counter FF4 is stopped.

For example, now assume that when the value of the counter FF4 is "9", a parity error of the counter takes place. At a time d shown in FIG. 4, one more pulse is supplied, because the t/2 period clock signal m5 (10 ns) is not stopped. Thus, the counter FF4 becomes "10" and stops. In this case, it is not clearly determined whether or not the error took place at the counter value "9" or "10". Thus, in the conventional circuit, when an error takes place in a circuit which operates with a t/2 period clock, the cause of the error cannot be completely determined.

SUMMARY OF THE INVENTION

An object of the present invention is to provide a clock control apparatus for stopping a t/N period clock signal produced from a basic period clock at a desired count value of a cycle counter of an information processing unit having a plurality of clocks with different phases.

The present invention is a clock control apparatus having a basic period clock (t) and a plurality of clocks with different phases from the basic period clock by t/N period, for use with an information processing unit, the apparatus comprising a clock signal generating portion (1) for generating pulses of the basic period clock, a cycle counter (2) for counting the number of pulses of the basic period clock received from the clock signal generating portion (1) when a start command is received and for outputting a cycle counter clock stop signal when the number of pulses becomes a predetermined count value, a control portion (3) for outputting a basic enable period signal for controlling the basic period clock and a delay enable period signal for controlling the t/N period clocks by a flag and the cycle counter clock stop signal, the flag being assignable before the start command is received, a basic period clock enabling portion (4) for receiving pulses of the basic period clock and for outputting the pulses of the basic period clock for a period designated by the basic enable period signal, and a t/N delay period clock enabling portion (5) for generating pulses of the t/N period clocks and for outputting the pulses for a period designated by the delay enable period signal.

These and other objects, features and advantages of the present invention will become more apparent in light of the following detailed description of a best mode embodiment thereof, as illustrated in the accompanying drawings.

DESCRIPTION OF PREFERRED EMBODIMENTS

Theory of Operation

Figure 5:
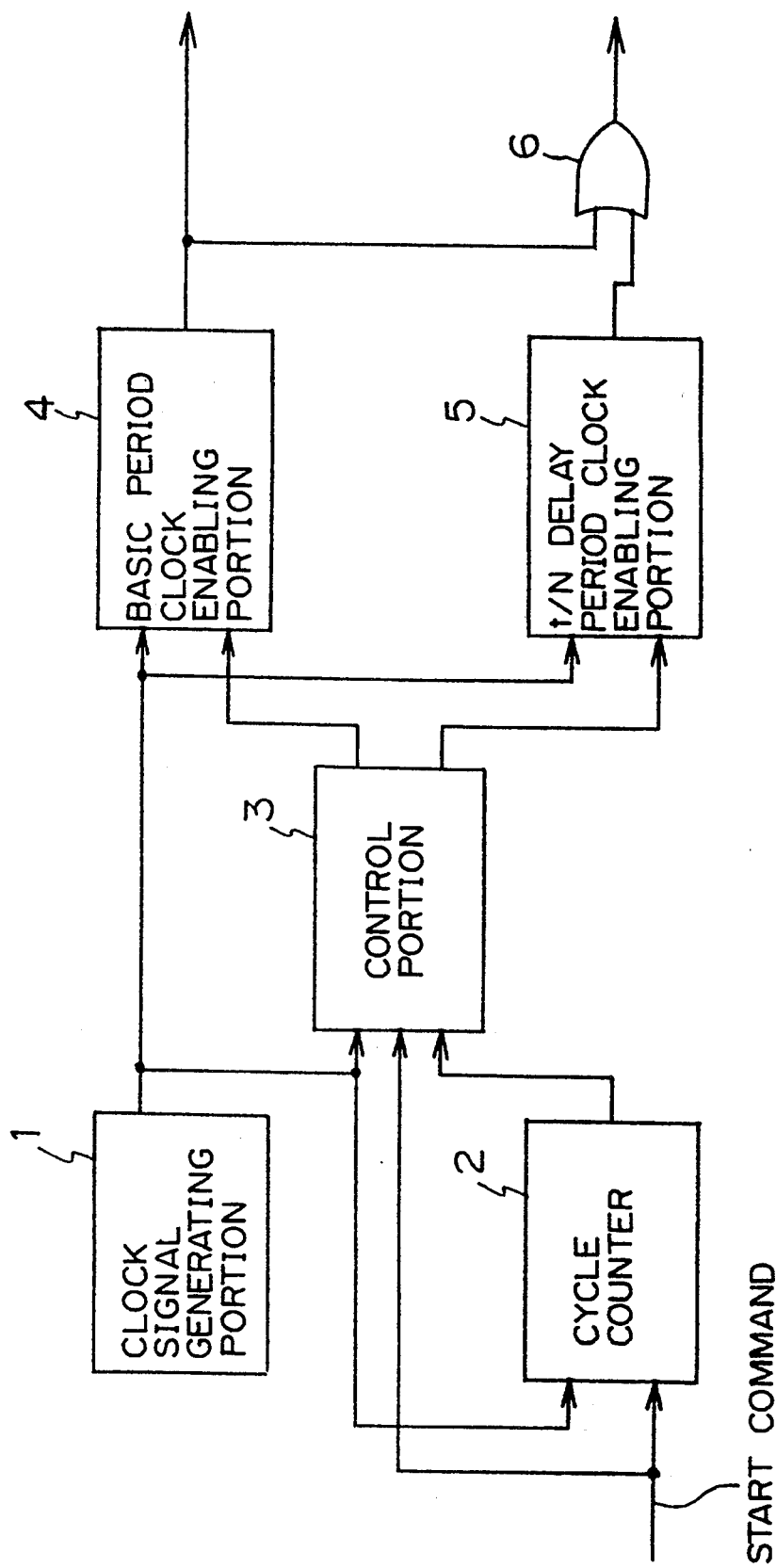
FIG. 5 is a block diagram showing the theory of the present invention.

FIG. 5 is a block diagram showing the theory of the present invention. The present invention relates to a clock control apparatus for controlling clocks so as to test the operation of for example a pipeline processing unit.

In FIG. 5, reference numeral 1 is a clock signal generating portion which generates a clock signal with a predetermined period t for use with an under-test unit. The under-test unit also uses other clocks with different phases.

Reference numeral 2 is a cycle counter. When the cycle counter 2 receives a start command, it counts the number of clock pulses received from the clock signal generating portion 1. When the value of the cycle counter 2 becomes a predetermined value, the cycle counter 2 issues a stop signal. The cycle counter 2 has a predetermined value with which a particular unit is tested and decrements or increments from or to the predetermined value. When there are a plurality of clocks with different phases, the cycle counter 2 performs additions and subtractions for the number of clocks corresponding to clock pulses generated by the clock signal generating portion 1. When the value of the cycle counter 2 becomes for example "1" or "2", it issues a stop signal.

Reference numeral 3 is a control portion. The control portion 3 is started when it receives a start command from the user. The control portion 3 determines a valid period for which the cycle counter 2 issues the stop signal corresponding to the value of a predetermined flag at least before the start command is received. Accordingly, the control portion 3 issues a basic enable period signal and a delay enable period signal. The basic enable period signal serves to output the clock signal generated by the clock signal generating portion 1 for a required period of time. On the other hand, the delay enable period signal serves to generate a signal with a different phase from the basic enable period signal. The above-described flag may be set by a command issued by the user.

Reference numeral 4 is a basic period clock enabling portion. The basic period clock enabling portion 4 receives the above-described clock signal from the clock signal generating portion 1 and outputs the clock signal for a period designated by the basic enable period signal. For example, the basic period clock enabling portion 4 is a gate circuit which is turned on and off corresponding to the basic enable period signal.

Reference numeral 5 is a t/N delay period clock enabling portion. The t/N delay period clock enabling portion 5 receives the clock signal from the clock signal generating portion 1 and enables the clock signal for a period designated by the delay enable period signal. In addition, the t/N delay period clock enabling portion 5 delays the clock signal received from the clock signal generating portion 1 by t/N period (where t is the period of the clock signal received from the clock signal generating portion 1). The t/N delay period clock enabling portion 5 comprises a gate circuit and a delay circuit. The gate circuit is turned on and off corresponding to the state of the delay enable period signal. The delay circuit delays the output of the gate circuit by the t/N period (for example, t/2 period). The delay circuit delays the received clock signal by, for example, the t/N period. By ORing the output signals of the basic period clock enabling portion 4 and the t/N delay period clock enabling portion 5, a clock signal with a frequency twice higher than the frequencies of the input clock signal is generated.

The signal generated by the clock signal generating portion 1 is sent to the basic period clock enabling portion 4 and the t/N delay period clock enabling portion 5. When the basic enable period signal received from the control portion 3 to the basic period clock enabling portion 4 is enabled, the control portion 3 outputs the basic clock signal to an external under-test unit. When the delay enable period signal received from the control portion 3 by the t/N delay period clock enabling portion 5 is in enable state, the control portion 3 enables the clock signal received from the clock signal generating portion 1 and outputs it with a delay of t/N period (for example, t/2 (where N is 2)).

In the case that the difference of the phases of the basic period clock enabling portion 4 and the t/N delay period clock enabling portion 5 is t/2, when their outputs are ORed by the gate circuit 6 (OR gate), a clock signal with a frequency twice higher than those of the inputs of the gate circuit 6 can be sent to the under-test unit.

When a flag setting command issued by the user and commands which cause the operations of the basic period clock enabling portion 4 and the t/N delay period clock enabling portion 5 to be stopped are sent to the control portion 3, it disables the clock signal received from the clock signal generating portion 1 and stops the supply of the clock signal. When the user sets, for example, an odd number to the cycle counter 2 and issues the start command, the flag is set and the start command is input. Thus, the cycle counter 2 is started.

The control portion 3 recognizes this operation. Thus, the control portion 3 sends the basic enable period signal which is in enable state to the basic period clock enabling portion 4. In addition, the control portion 3 sends the delay enable period signal which is in enable state to the t/N delay period clock enabling portion 5. For example, when the value of the flag is "1", the control portion 3 enables the delay enable period signal and the basic enable period signal which is later than the delay enable period signal by one clock cycle. After the cycle counter 2 outputs the stop signal, the control portion 3 disables both the basic enable period signal and the delay enable period signal at the same time. When the value of the flag is "0", the control portion 3 enables both the basic enable period signal and the delay enable period signal at the same time. After the cycle counter 2 outputs the stop signal, the control portion 3 disables the delay enable period signal and the basic enable period signal which is later than the delay enable period signal by one clock cycle.

When the value of the flag is "1", the delay enable period signal is longer than the basic enable period signal by one clock cycle. In contrast, when the value of the flag is "0", the basic enable period signal is longer than the delay enable period signal by one clock cycle. When the value of the cycle counter 2 is the same odd number and the value of the flag is "1", the number of clock pulses in the enable period of the basic enable period signal becomes (setting value/2) (only integer part). When the value of the cycle counter 2 is the same odd number and the value of the flag is "0", the number of clock pulses in the enable period of the basic enable period signal becomes [setting value/2 (integer part)]+1. Thus, even if the value of the cycle counter 2 is the same odd number, the number of pulses of the basic clock signal can be varied by +1.

Thus, clock pulses corresponding to the value of the cycle counter 2 are output from the OR gate 6. In addition, even if the value of the cycle counter 2 is an odd number, the number of clock pulses which are output from the basic period clock enabling portion 4 can be set to the value of the integer part of n/2 or the value of the (integer part of n/2)+1.

At this time, the number of clock pulses which are output from the t/N delay period clock enabling portion 19 becomes the value of (integer part of n/2)+1 or the value of (integer part of n/2). Thus, the number of clock pulses corresponding to the setting value of the cycle counter 2 can be output from the OR gate.

DESCRIPTION OF PREFERRED EMBODIMENT

Figure 6A:
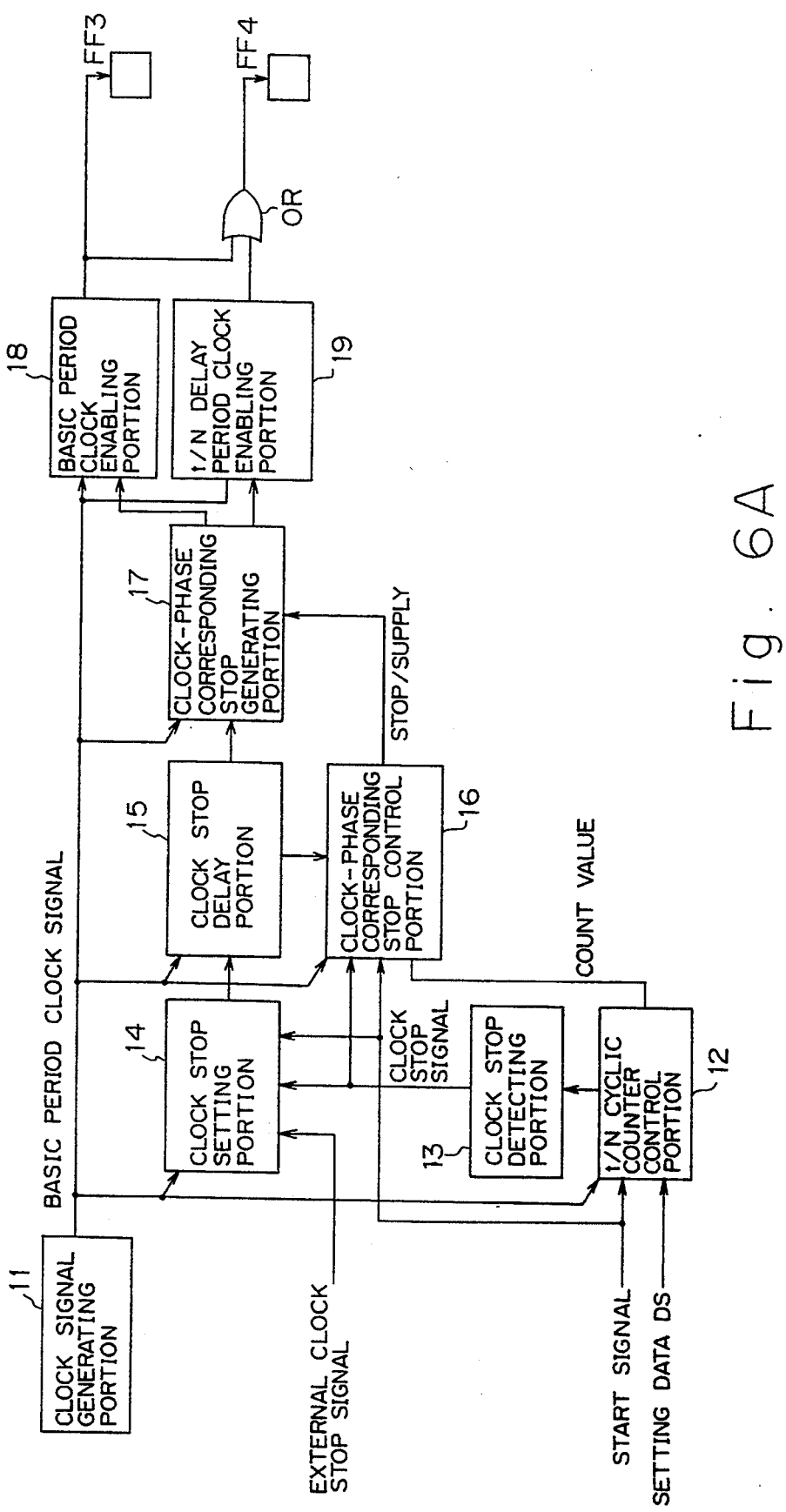
FIGS. 6A and 6B are block diagrams showing the construction of an embodiment of the present invention.

FIG. 6A is a block diagram showing the construction of an embodiment of the present invention. First of all, the operation of each portion of the embodiment will be described. Reference numeral 11 is a clock signal generating portion. The clock signal generating portion 11 generates a basic period clock signal with which a unit under the test operates. The basic period clock signal is supplied to a t/N cycle counter control portion 12, a clock stop setting portion 14, a clock stop delay portion 15, a clock-phase corresponding stop control portion 16, a clock-phase corresponding stop generating portion 17, a basic period clock enabling portion 18, and a t/N delay period clock enabling portion 19. These portions synchronously operate with the clock signal.

The t/N cycle counter control portion 12 stores external setting data such as a setting value (setting data DS) of a cycle counter. When the t/N cycle counter control portion 12 receives a start signal which represents a start command from the outside of the apparatus, it decrements the setting value by n (where n is 2 or more). It should be noted that instead of the operation of "decrement by n", the t/N cycle counter control portion 12 may increment the setting value by n. In this case, a clock stop detecting portion 13 detects a predetermined value.

The clock stop detecting portion 13 outputs a clock stop signal when the value of the t/N cycle counter control portion 12 becomes a predetermined value.

The clock stop setting portion 14 sets a clock stop state when it receives a clock stop signal from the clock stop detecting portion 13 or a clock stop signal from the outside. When the clock stop setting portion 14 receives a start signal from the outside, it cancels the clock stop state. In other words, the clock stop setting portion 14 receives a clock stop signal from the outside so as to cause an under-test unit to perform a designated operation. With the external clock stop signal, the clock stop setting portion 14 issues a stop command to the under-test unit. Thus, all operations of the under-test unit are stopped. In this period, the clock stop setting portion 14 sets the value of a cycle counter which will be described later.

When the under-test unit receives a start signal, it operates again. When the clock stop detecting portion 13 receives the clock stop signal from the t/N cycle counter control portion 12, it stops the supply of the clock signal. For example, the external clock stop signal serves to temporarily stop the operation of the under-test unit. With the external clock stop signal, the circuit according to the embodiment of the present invention temporarily stops the supply of clock signal. The t/N cycle counter control portion 12 stores a count value which causes the under-test unit to stop at what process. The under-test unit is operated with the start command. After the number of processes designated is completed, the under-test unit is stopped.

The clock stop delay portion 15 delays the output signal of the clock stop setting portion 14. For example, the clock stop delay portion 15 is a shift register constructed of a predetermined number of stages of flip-flops. The clock stop delay portion 15 generates a timing for stopping the supply of clock signal.

The clock-phase corresponding stop control portion 16 issues output signals of the flip-flops of the clock stop delay portion 15 (the number of these output signals is, for example, five), the clock stop signal of the clock stop detecting portion 13, a count value of the t/N cycle counter control portion 12, output stop/start signals of the basic period clock signal corresponding to the external start signal, and a signal for controlling supply and stop of the t/N delay period clock signal. These signals, described later, are outputs of various flags.

The clock-phase corresponding stop generating portion 17 generates clock supply enable signals of the basic period clock signal and t/N delay period clock signal by a combination of logic circuits corresponding to the control signals of the clock-phase corresponding stop control portion 16 (namely, the outputs of the plurality of (for example, five) flip-flops of the clock stop delay portion 15 corresponding to the states of various flags). In other words, the clock-phase corresponding stop generating portion 17 generates a basic enable period signal and a delay enable period signal.

The basic period clock enabling portion 18 enables the basic period clock signal of the clock signal generating portion 11 with the clock supply enable signal for the basic period clock signal (namely, the basic enable period signal) received from the clock-phase corresponding stop generating portion 17.

The t/N delay period clock enabling portion 19 enables the basic period clock signal of the clock signal generating portion 11 with the clock supply enable signal for the t/N delay period clock signal (namely, the delay enable period signal) received from the clock-phase corresponding stop generating portion 17. In addition, the t/N delay period clock enabling portion 19 delays the enabled clock signal by t/N period. It should be noted that the number of the delay circuits is not limited to one. Instead, the number of the delay circuits may be the number of phases being divided (for example, (N−1) delay circuits).

Next, the operation shown in FIG. 6A will be described. In the normal operation, the basic period clock signal of the clock signal generating portion 11 is supplied through the basic period clock enabling portion 18 and the t/N delay period clock enabling portion 19 to counters FF3 and FF4 which are for example units under the test.

Since the output of the basic period clock enabling portion 18 is supplied to the counter FF3, a clock signal with the same period as the basic period clock signal is supplied to the counter FF3. On the other hand, the outputs of the basic period clock enabling portion 18 and the t/N delay period clock enabling portion 19 are ORed by an OR gate and then supplied to the counter FF4. Since the phase of the t/N delay period clock enabling portion 19 is later than the phase of the basic period clock enabling portion 18 by t/N period, when N is "2", a clock signal with a frequency twice higher than the frequencies of the inputs of the OR gate is supplied to the counter FF4.

With such an operation, a required clock signal is supplied to an under-test unit. If an error takes place in the under-test unit due to an incorrect control or an incorrect circuit connection, the error should be located. To do that, the position where the under-test unit stopped is detected as an external clock stop signal. The external clock stop signal is supplied to the clock stop setting portion 14. Thus, the operation of the under-test unit is temporarily stopped.

Thereafter, the count value of the t/N cycle counter control portion 12 is set. Conventionally, the count value was the number of clock pulses generated by the clock signal generating portion 11. However, in the embodiment of the present invention, the count value of clock pulses with n times higher frequency is set. This value is not limited to n times higher than the frequency of the clock signal. For example, any clock with any higher frequency as in (an+1) times, (an+2) times, ... , (an+n−1) times (where a and n are any integers) may be set.

The t/N cycle counter control portion 12 comprises, for example, a latch circuit and a n-decrement circuit. Thus, whenever one clock pulse is input to the t/N cycle counter control portion 12, the value of the latch circuit is decremented by n and then latched. With this construction, whenever a clock pulse is received, the value of the latch circuit is decremented by n. The setting value of the latch circuit is DS. When the t/N cycle counter control portion 12 starts the count operation, it fetches the setting data DS. When the t/N cycle counter control portion 12 receives the start signal, it starts an arithmetic operation.

The start signal is also supplied to the clock stop setting portion 14. When the clock stop setting portion 14 receives the start signal, it changes the clock stop state to the clock supply state. The clock stop delay portion 15 is constructed of, for example, a five-stage shift register. The output of each stage of the shift register is supplied to the clock-phase corresponding stop control portion 16. A stop signal which is a pulse (for example, "1") which represents the start and stop of delay of a total of five clock pulses is supplied to the clock-phase corresponding stop control portion 16.

The clock-phase corresponding stop control portion 16 has a plurality of flags which determine clock stop/-start timings corresponding to the count value of the t/N cycle counter control portion 12, the clock stop signal of the clock stop detecting portion 13, the start signal, the outputs of the shift register for five clock pulses of the clock stop delay portion 15, and so forth. The clock-phase corresponding stop control portion 16 sends the values of the flags to the clock-phase corresponding stop generating portion 17.

The clock-phase corresponding stop generating portion 17 generates an enable signal which controls the basic period clock enabling portion 18 and the t/N delay period clock enabling portion 19 by using the signals and flags of the five-stage shift register of the clock stop delay portion 15. With one flag of the clock-phase corresponding stop control portion 16, the clock stop/supply signals are controlled. For example, when the counter value is an odd number before the t/N cycle counter control portion 12 is started, the basic enable period signal and the delay enable period signal which are output from the clock-phase corresponding stop generating portion 17 are controlled as follows.

When the value of the flag is "1", the clock-phase corresponding stop control portion 16 enables the delay enable period signal and the basic enable period signal which is later than the delay enable period signal by one clock cycle. When the clock-phase corresponding stop control portion 16 receives the stop signal from the t/N cycle counter control portion 12, it disables both the delay enable period signal and the basic enable period signal at the same time. When the value of the flag is "0", the clock-phase corresponding stop control portion 16 enables both the delay enable period signal and the basic enable period signal at the same time. When the clock-phase corresponding stop control portion 16 receives the stop signal from the t/N cycle counter control portion 12, it disables the delay enable period signal and the basic enable period signal which is later than the delay enable period signal by one clock cycle.

With the basic enable period signal and the delay enable period signal, clock signals with different phases can be output in the enable period. By ORing the outputs of the basic period clock enabling portion 18 and the t/N delay period clock enabling portion 19, a clock signal with a frequency N times higher than the basic clock signal can be generated. Instead of N clock signals with different phases, m/N clock signals with different phases may be generated.

With the above-described operation, when the period of the clock signal which is supplied to the counter FF3 is the same as the period of the basic period clock signal and N is 2, a clock signal with a frequency twice higher than the frequency of the basic period clock signal is supplied to the counter FF4. In this case, when an odd number is set to the t/N cycle counter control portion 12, by the OR gate, a corresponding clock signal is generated. The counter FF3 counts the value of N/2 (digits after the decimal time are truncated) or the value of [N/2 (digits after the decimal time are truncated)+1] corresponding to the value of the flag. The value of the flag is determined by both the state where the under-test unit is stopped and external settings before the stop command is received from the outside. For example, when the user sets the value of the flag before stopping the under-test unit with the execution start command or the like, the unit can be stopped at a desired phase of the t/N period clock signal.

Figure 6B:
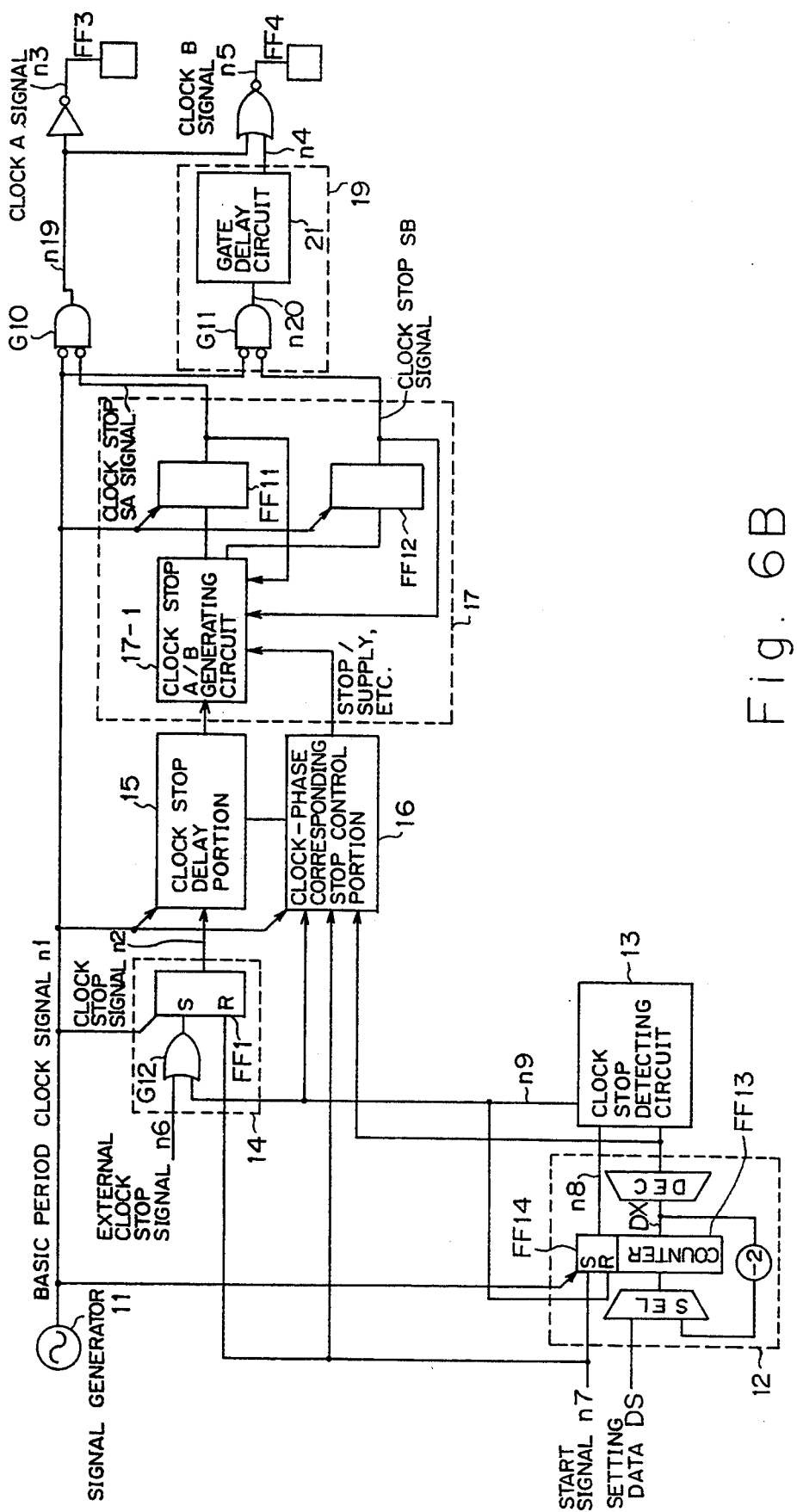

FIG. 6B is a detailed block diagram of FIG. 6A.

Figure 7:
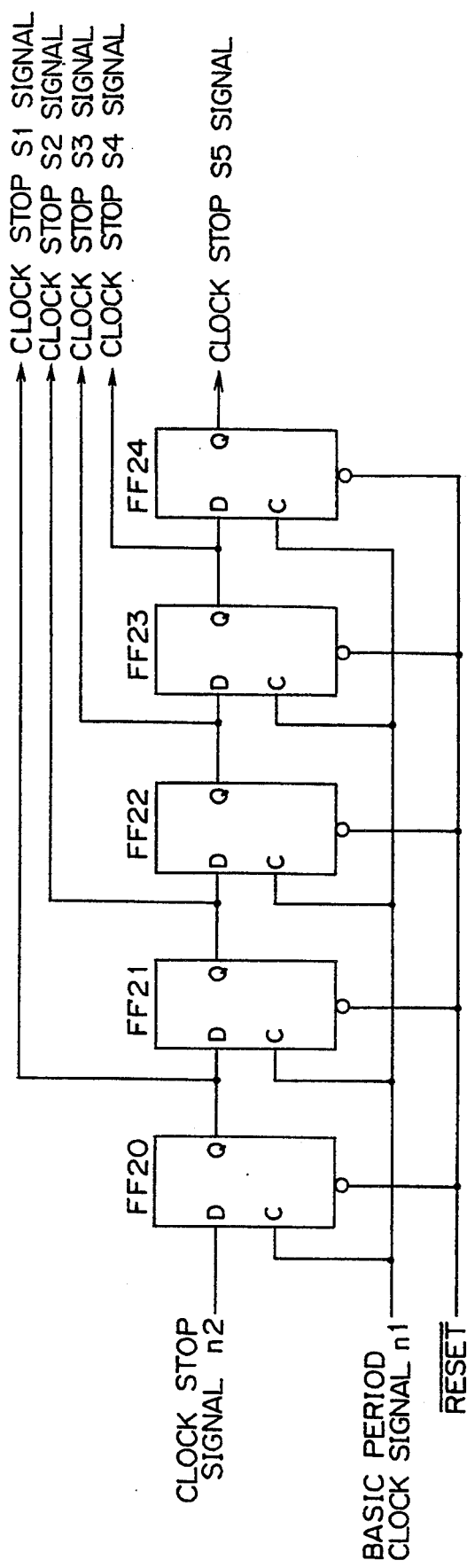
FIG. 7 is a circuit diagram showing the construction of a clock stop delay portion.

FIG. 7 is a circuit diagram showing the construction of a clock stop delay portion (15) of FIG. 6B.

FIGS. 8A to 8E are circuit diagrams showing the construction of a clock-phase corresponding stop control portion (16) of FIG. 6B.

Figure 9A:
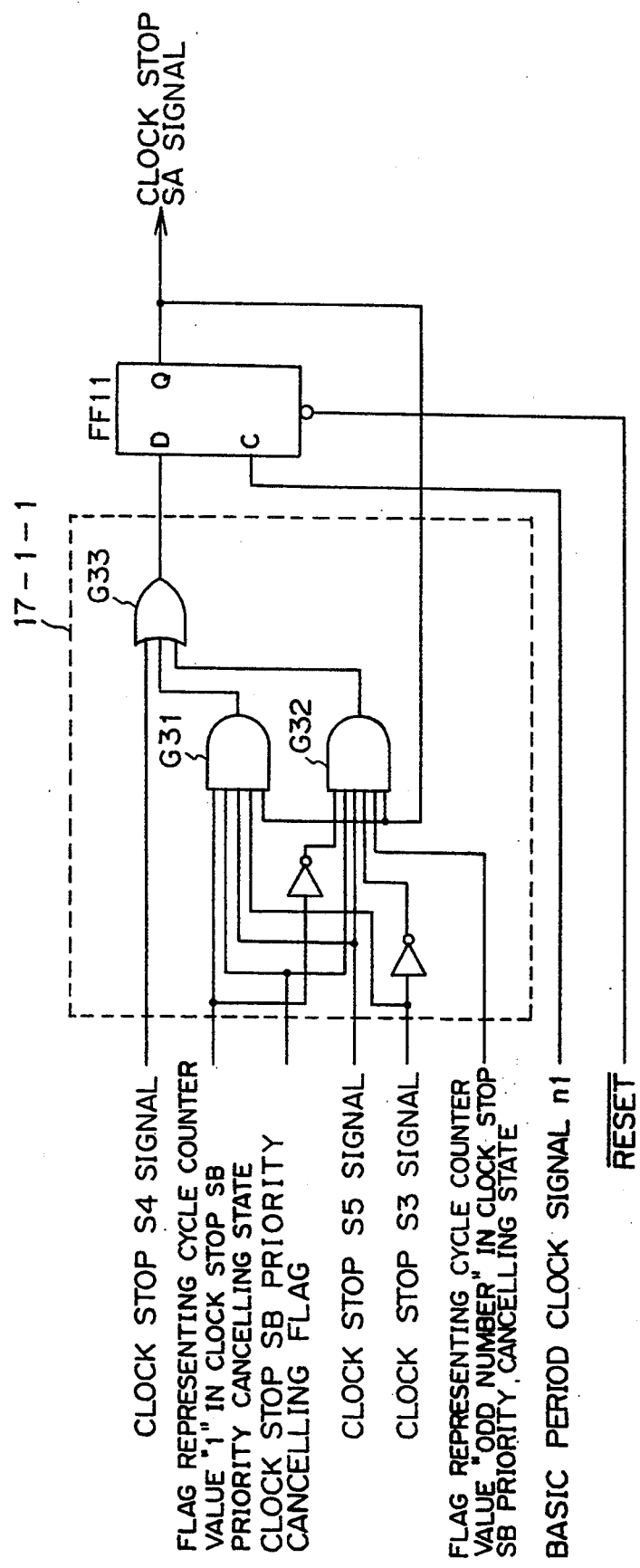
FIGS. 9A and 9B are circuit diagrams showing the construction of a clock phase corresponding stop generating portion.
Figure 9B:
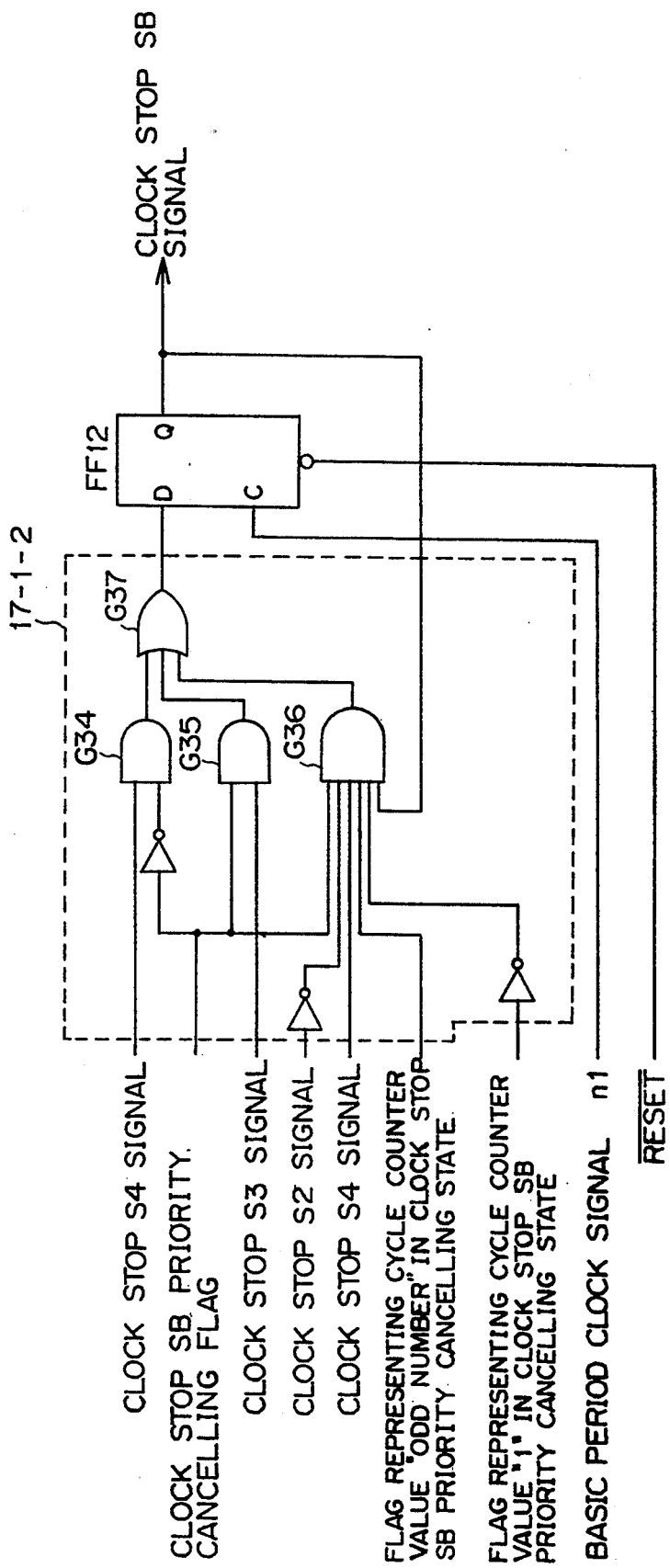

FIGS. 9A and 9B are circuit diagrams showing the contraction of a clock stop A/B generating circuit (17-1) of FIG. 6B.

Figure 10A:
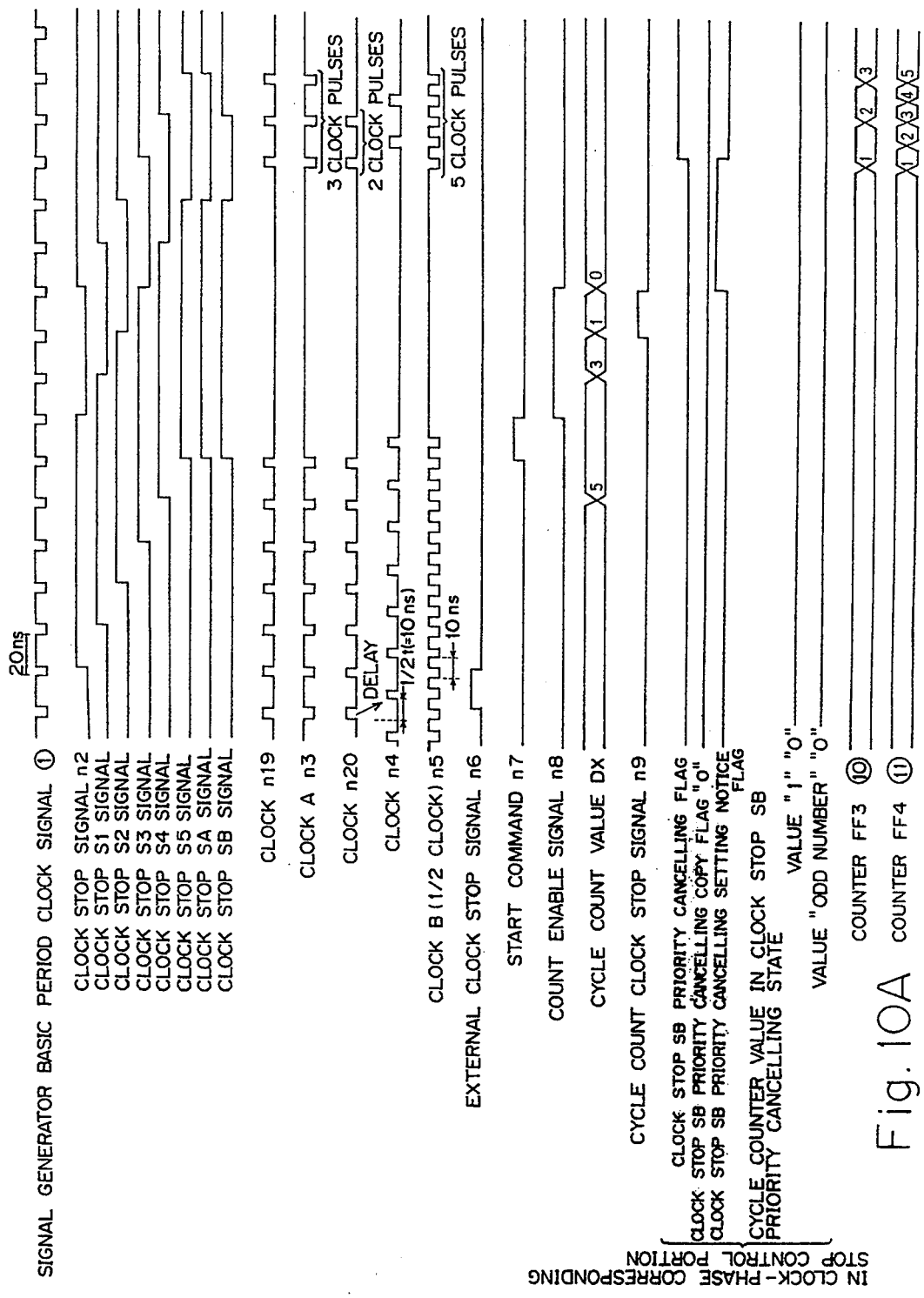
FIGS. 10A and 10B are timing charts.
Figure 10B:
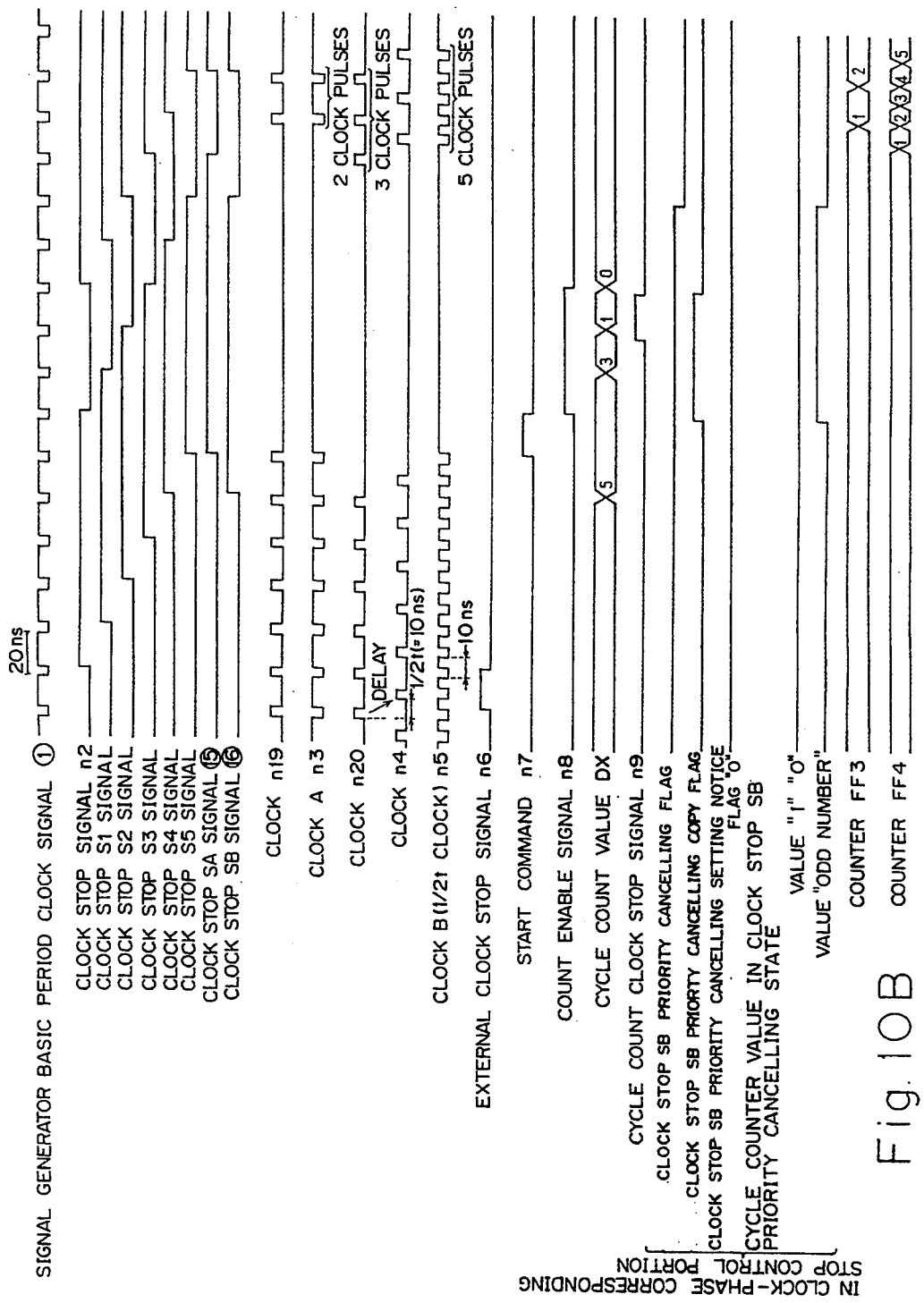

FIGS. 10A and 10B are timing charts of signals used in the embodiment. For the sake of the simplicity, in FIG. 6B, the same circuits as FIG. 6A are denoted by the same reference numerals thereof. In FIG. 6B, N is 2.

In the circuit diagrams, a $\overline{\text{RESET}}$ signal represents that a system reset is input.

In the following description, (n_) represents a signal number.

The case where a cycle counter is started while the value of a clock stop SB priority canceling flag is "0" in FIG. 6B will be described.

In FIG. 10A, with an external clock stop signal (n6), a clock A signal (n3) is first stopped. Then, a clock B (n3) is stopped. Thereafter, a cycle count operation is performed. When the value of the clock stop SB priority canceling flag is "0", five pulses of a t/2 period clock signal are output. In addition, three pulses of a basic period clock signal are output. The clock stop SB priority canceling flag is a signal which is output from a clock-phase corresponding stop control portion 16. This flag represents that the clock stop SB signal is cancelled earlier than a clock stop SA signal.

The clock stop setting portion 14 comprises a gate G12 and a flip-flop FF1. The gate G12 has two inputs and is an OR logic circuit. The output of the gate G12 is connected to a set terminal of the flip-flop FF1. An external clock stop signal (n6) and a clock stop signal (n9) which is output from a clock stop detecting circuit 13 are supplied to the gate G12. A start signal (n7) is supplied to a reset terminal of the flip-flop FF1.

With the external clock stop signal (n6), when a set signal is supplied to the clock stop flip-flop FF1 through the gate G12, the flip-flop FF1 is set. The output of the flip-flop FF1 is supplied to a clock stop delay portion 15. The clock stop delay portion 15 is a shift register constructed of five flip-flops as shown in FIG. 7. The five stages of flip-flops FF20 to FF24 shift the output of the flip-flop FF1 one after the other. The output of the first stage of flip-flop FF20 is a clock stop S1 signal. The output of the second stage of flip-flop FF21 is a clock stop S2 signal. The outputs of the third to fifth stages of flip-flops FF22 to FF24 are clock stop signals S3 to S5, respectively.

Since the value of the clock stop SB priority canceling flag of the clock-phase corresponding stop control circuit 16 is "0", a clock stop A/B generating circuit 17-1 sends the clock stop S4 signal of the clock stop delay portion 15 to a clock stop SA flip-flop FF11 and a clock stop SB signal flip-flop FF12. In other words, in the circuit diagram shown in FIG. 9A, since the value of the clock stop SB priority canceling flag is "0", AND gates G31 and G32 output "0". Thus, OR gate G33 outputs the clock stop S4 signal as it is. Likewise, in the circuit diagram shown in FIG. 9B, AND gates G35 and G36 output "0". Since an AND gate G34 outputs the clock stop S4 signal as it is, an OR gate G37 also outputs the clock stop S4 signal as it is. The flip-flops FF11 and FF12 obtain the clock stop S4 signal with their basic period clock pulses. The flip-flops FF11 and FF12 output the clock stop S4 signal to logic circuits G10 and G11 with a delay of one clock cycle. The basic period clock signal (n1) is suppressed by a gate G10 with the stop signal received from the clock stop SA flip-flop FF11. Thus, a clock signal (n19) is generated. In addition, the basic period clock signal (n1) is suppressed by the gate. G11 with the stop signal received from the clock stop SB flip-flop FF12. Thus, a clock signal (n20) is generated. A t/n delay period clock enabling portion 19 comprises the gate G11 and a gate delay circuit 21.

The clock signal (n20) is sent to the gate delay circuit 21. The gate delay circuit 21 outputs a clock signal (n4) with a delay of a predetermined period of time. Thus, when the basic period is 20 ns, the phase of the clock signal (n4) is later than those of the clock signal (n19) and clock signal (n20) by 10 ns. A clock signal (n3) is generated by ORing the clock signal (n4) and the clock signal (n19). Thus, the period of the clock signal (n5) is t/2. Consequently, the clock signal (n5) stop 10 ns after the clock signal (n3) stops.

A counter FF3 uses a clock A signal (n3). Since the clock A signal (n3), which is the basic clock signal, is suppressed, the counter FF3 is stopped. On the other hand, since the counter FF4 uses a clock B signal (n5) which is suppressed 10 ns after the clock A signal (n3) stops, the counter FF4 is stopped 10 ns after the counter FF3 is stopped.

After the counters FF3 and FF4 are stopped, a cycle value (for example, "5") is loaded to a cycle counter FF13. The start signal which represents the start command is sent to the t/N cycle counter 13.

When the start signal (n7) becomes high ("1") which represents -the start command, a set-reset flip-flop FF14 is set. The set-reset flip-flop FF14 outputs a cycle counter enable signal (n8) which is high ("1"). Thus, the cycle counter starts a decrement by "2" operation. In addition, the clock stop flip-flop FF1 is reset. The output signal (n2) of the flip-flop FF1 is sent to a shift register (clock stop signals S1 to S5) in the clock stop delay portion 15 and shifted in succession.

The clock stop A/B generating circuit 17-1 which receives the delay output of the clock stop delay portion 15 determines the value of the clock stop SB priority canceling flag of the clock-phase corresponding stop control portion 16. At this time, since the value of the flag is "0", as described above, the clock stop S4 signal of the clock stop delay portion 15 is sent to the flip-flops FF11 and FF12. The flip-flops FF11 and FF12 output a clock stop SA signal and a clock stop SB signal, especctively.

Since the stop of the clock stop SA signal is reset (namely, the flip-flop FF11 is reset), the basic period clock signal (n1) is supplied to the clock signal (n19). In addition, the basic period clock signal (n1) is supplied to the clock signal (n20) Thus, the clock signal (n3) and the clock signal (n5) which are reverse signals of the clock signal (n19) are also supplied.

The clock signal (n4) is supplied t/2 (namely, 10 ns) after the clock signal (n20) is supplied. The clock signal (n5) is generated by ORing the clock signal (n19) and the clock signal (n4). Thus, the period of the clock signal (n4) is ½ of those of the clock signal (n19) and clock signal (n4).

On the other hand, the output of the counter FF13 in the t/N cycle counter control portion 12 is decremented by 2 by a "−2" circuit. This value is sent to the counter FF13 through a selector SEL. The counter FF13 is a latch circuit. The counter FF13 latches the signal with a pulse of the basic clock signal. Whenever this operation is performed, the value of the counter FF13 decrements by "−2". In count mode, the selector SEL selects the output of the "−2" circuit. In set mode, the selector SEL selects setting data DS.

When the count value of the cycle counter FF13 which performs the decrement operation becomes "1", a decoder DEC detects this value and sends it to the clock stop detecting circuit 13. The clock stop detecting circuit 13 causes a cycle counter clock stop signal (n9) to become high ("1") for one clock cycle. The decoder DEC detects whether the count value is "1" or "2". When the clock stop detecting circuit 13 detects a conditional match, it generates a cycle counter clock stop signal.

Figure 8A:
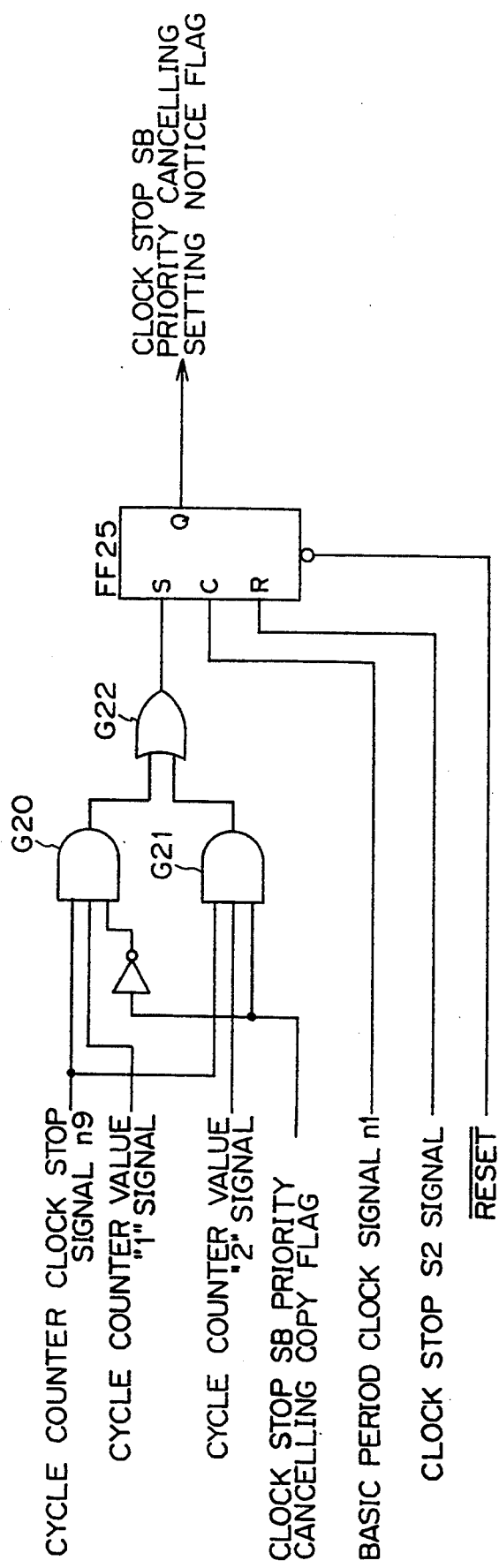
FIGS. 8A to 8E are circuit diagrams showing the construction of a clock-phase corresponding stop control portion.
Figure 8B:
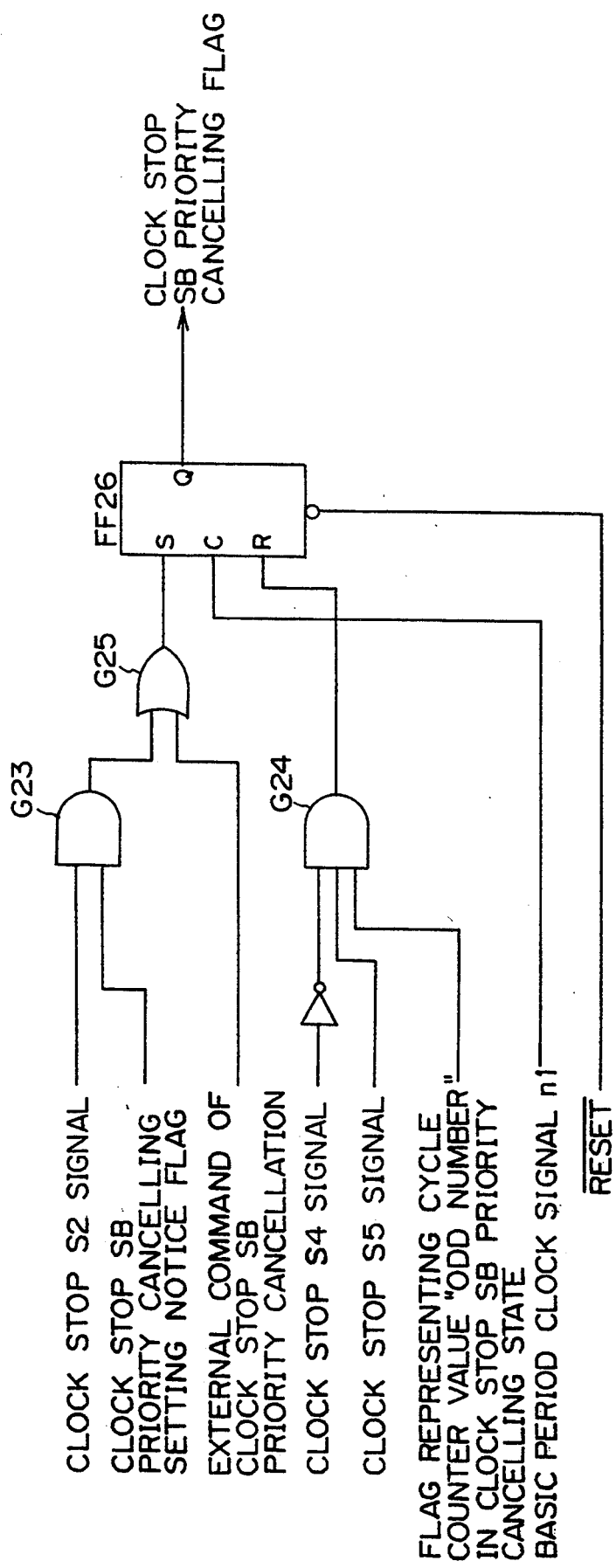
Figure 8C:
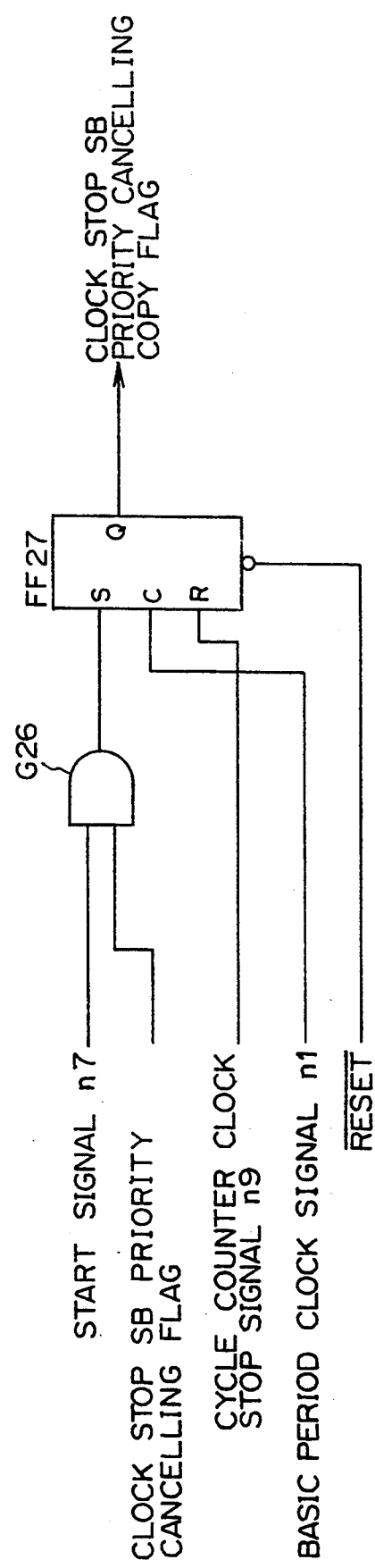

A clock stop SB priority canceling copy flag of the clock-phase corresponding stop control portion 16 is constructed of a circuit shown in FIG. 8C. When the start signal becomes high ("1"), the value of the clock stop SB priority cancelling flag is "0". Thus, the output of the AND gate G26 does not become "1". In addition, the clock stop SB priority canceling copy flag is not set.

At this time, the value of a clock stop SB priority canceling setting notice flag of the clock-phase corresponding stop control portion 16 is set to "1". In FIG. 8A, a cycle counter value "1" signal becomes high ("1") at the same timing at which the cycle counter clock stop signal becomes high ("1"). Since the value which was set to the cycle counter is "5", a cycle counter value "2" signal is still low ("0") rather than high ("1"). In addition, since the value of the clock stop SB priority canceling copy flag is "0", an AND gate G20 outputs "1" for one clock cycle. An AND gate G21 outputs "0". Thus, an OR gate G22 outputs "1" for one clock cycle. When the basic period clock signal becomes high, the value of the clock stop SB priority canceling setting notice flag becomes "1". In addition, when the clock stop S2 signal becomes high ("1"), the clock stop SB priority canceling setting notice flag is reset at a timing that the basic period clock signal becomes high.

When the clock stop flip-flop FF1 is set with the cycle counter clock stop signal (n9), the flip-flop FF1 outputs a signal to the five-stage shift register in the clock stop delay portion 15. In the five-stage shift register, the signal is successively shifted. When the clock stop S2 signal of the clock stop delay portion 15 becomes high ("1"), the priority cancelling setting notice flag is reset with a delay of one clock cycle. In addition, the value of the clock stop SB priority cancelling flag becomes "1". In FIG. 8B, both the clock stop S2 signal and the clock stop SB priority canceling setting notice flag become "1" at the same time for one cycle of the basic period clock signal. Thus, an AND gate G23 outputs "1" for one clock cycle. When the basic period clock signal becomes high, the value of the clock stop SB priority cancelling flag becomes "1".

Figure 8D:
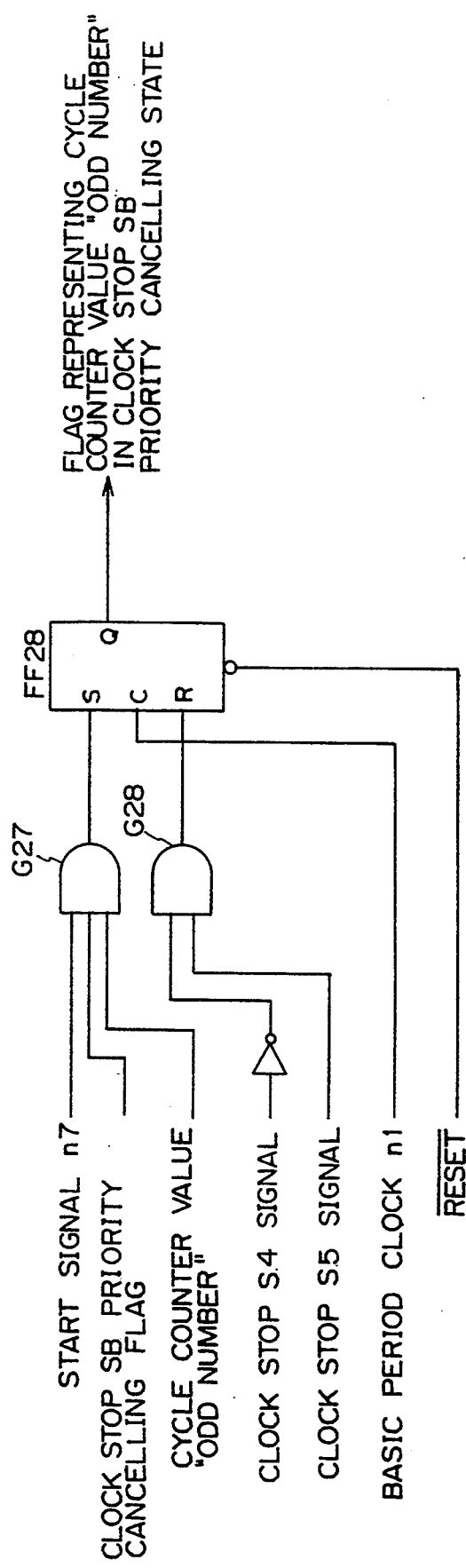

A flag representing cycle counter value "odd number" in clock stop SB priority cancelling state of the clock-phase corresponding stop control portion 16 is constructed of a circuit shown in FIG. 8D. When the start signal (n7) becomes high ("1"), since the value of the clock stop SB priority canceling flag is "0", an AND gate G27 still outputs "0". In addition, a flip-flop FF28 still outputs "0". Thus, the flag representing the cycle counter value "odd number" in clock stop SB priority cancelling state is not set.

Figure 8E:
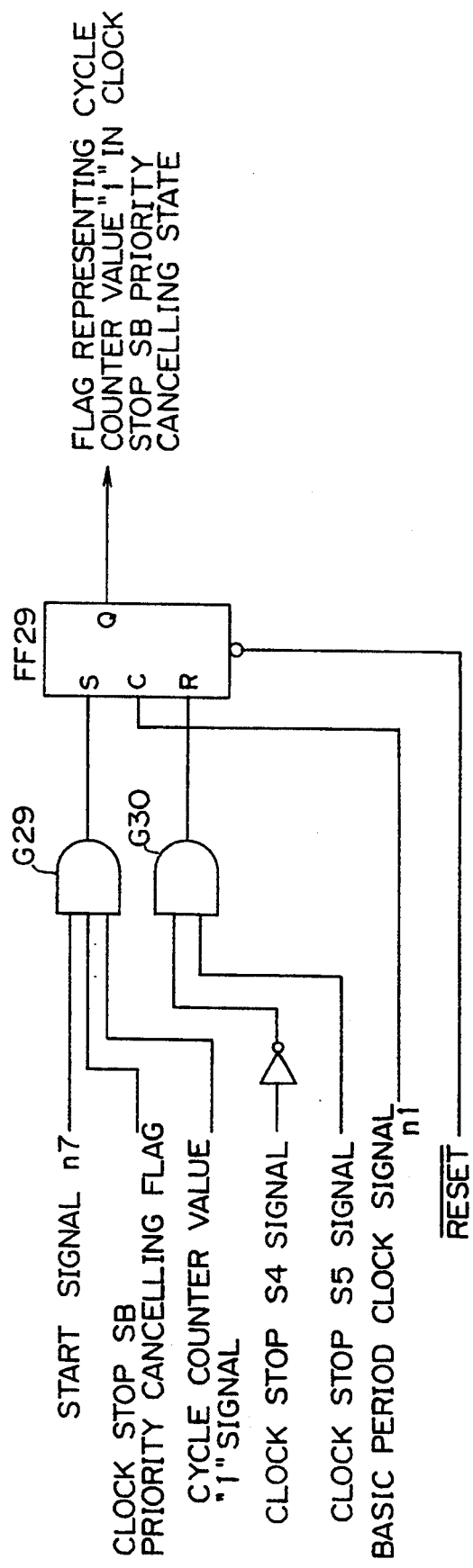

A flag representing cycle counter value "1" in the clock stop SB priority cancelling state of the clock-phase corresponding stop control portion 16 is provided by a circuit shown in FIG. 8E. When the start signal (n7) becomes high ("1"), since the value of the clock stop SB priority cancelling flag is "0". Thus, an AND gate G29 still outputs "0". A flip-flop FF29 still outputs "0". Consequently, the flag representing cycle counter value "1" in clock stop SB priority cancelling state is not set.

In addition, since the value of the clock stop SB priority canceling flag of the clock-phase corresponding stop control portion 16 becomes "1", a clock stop S3 signal of the clock stop delay portion 15 is sent to the clock stop SB flip-flop FF12. One cycle later, a clock stop S4 signal is sent to the clock stop SA flip-flop FF11. These operations will be described with reference to FIGS. 9A and 9B.

In FIG. 9A, since the value of the flag representing cycle counter value "1" in clock stop SB priority cancelling state is "0", an AND gate G31 outputs "0". In addition, since the clock stop SA signal is low ("0"), an AND gate G32 outputs "0". An OR gate G33 outputs the clock stop S4 signal. Thus, the clock stop SA signal becomes high ("1") one clock cycle after the clock stop S4 signal becomes high.

Since the value of the flag representing cycle counter value "odd number" in clock stop SB priority cancelling state shown in FIG. 9B is "0", an AND gate G36 outputs "0". In addition, since the value of the clock stop SB priority cancelling flag is "1", an AND gate G34 outputs "0". An AND gate G35 outputs the clock stop S3 signal.

Thus, the clock stop S3 signal is output to an OR gate G37. As a result, the clock stop SB signal becomes high ("1") one clock cycle after the clock stop S3 signal becomes high.

The clock signal (n20) is suppressed with the clock stop SB signal of the clock stop SB flip-flop FF12. The clock signal (n19) is suppressed with the clock stop SA signal 20 ns after the clock signal (n20) is suppressed. In other words, when the clock signal (n3) is suppressed, the clock signal (n5) is also suppressed.

As described above, the clock B signal (n5) is a clock signal consisting of five cycles which is supplied to the cycle counter. The clock B signal (n5) can be supplied according to the value set in the cycle counter. In addition, the clock A signal (n3) is a cycle signal consisting of three cycles.

The counters FF3 and FF4 which are units under the test count the numbers of clock pulses while the cycle counter is operating.

FIG. 10B shows the operation of the cycle counter after the clock A signal (n3) and the clock B signal (n5) are stopped at the same time by an external clock stop command. When the value of the clock stop SB priority canceling flag is "1", five pulses of the t/2 period clock signal are output. In addition, two pulses of the basic period clock signal are output. Next, these operations will be described.

When the clock stop flip-flop FF1 is set with the external clock stop signal (n6), the output signal thereof is sent to the five-stage shift register in the clock stop delay portion 15. This signal is shifted successively in the shift register.

As described above, since the value of the clock stop SB priority canceling flag of the clock-phase corresponding stop control portion 16 is "1", the clock stop SA/SB generating circuit sends the clock stop S3 signal of the clock stop delay portion 15 to the clock stop SB flip-flop FF12 and the clock stop S4 signal to the clock stop SA flip-flop FF11.

Since the value of the flag representing cycle counter value "1" in clock stop SB priority cancelling state shown in FIG. 9A is "0", the AND gate G31 outputs "0". In addition, since the clock stop SA signal is low ("0"), the AND gate G32 outputs "0". Thus, the OR gate G33 outputs the clock stop S4 signal. As a result, the clock stop SA signal becomes high ("1") one clock cycle after the clock stop S4 signal becomes high.

Since the value of the flag representing cycle counter value "odd number" in clock stop SB priority cancelling state in FIG. 9B is "0", the AND gate G36 outputs "0". In addition, since the value of the clock stop SB priority cancelling flag is "1", the AND gate G34 outputs "0". The AND gate G35 outputs the clock stop S3 signal. Thus, the OR gate G37 outputs the clock stop S3 signal. The clock stop SB signal becomes high ("1") one clock cycle of the basic period clock signal after the clock stop S3 signal becomes high. The flip-flops FF11 and FF12 receive signals in the above-described manner.

The basic period clock signal (n1) is suppressed by the gate G11 with the clock stop SB signal of the flip-flop FF12. Thus, the clock signal (n20) is stopped. One cycle (20 ns) later, the basic period clock signal (n1) is suppressed by the gate G10 with the clock stop SA signal. Thus, the clock signal (n19) is stopped. Consequently, the clock signals (n20) and (n19) are output from the gates G11 and G10, respectively. When the clock signal (n19) is stopped, the clock A signal (n3) is also stopped.

The clock signal (n20) is sent to the gate delay circuit 21. The period of the clock signal (n4) is shorter by t/2 (namely, 10 ns) than those of the clock signal (n19) and the clock signal (n20). The clock signal (n4) is generated by ORing the clock signal (n4) and the clock signal (n19). Thus, the period of the clock B signal (n5) is shorter by t/2 than those of the clock signal (n4) and the clock signal (n19).

When the clock A signal (n3) is stopped, the clock B signal (n5) is also stopped.

Since the clock A signal (n3) with which the counter FF3 operates is stopped, the operation of the counter FF3 is stopped. In addition, the clock B signal (n5) with which the counter FF4 operates is suppressed, the operation of the counter FF4 is stopped.

After the operations of the counters FF3 and FF4 are stopped, a cycle value "5" is loaded to the cycle counter FF13. In addition, the start command (n7) is issued. In other words, the state of the start signal (n7) is changed to high ("1") for one clock cycle.

When the start signal (n7) becomes high, the cycle counter enable signal becomes high. Thus, the cycle counter F13 starts a decrement by "2" operation. In addition, the clock stop flip-flop FF1 is reset. The output (n2) of the flip-flop FF1 is sent to the shift register (clock stop signals S1 to S5) in the clock stop delay portion 15. The signal (n2) is successively shifted in the shift register.

Since the clock stop SB priority cancelling copy flag of the clock-phase corresponding stop control portion 16 is constructed of the circuit shown in FIG. 8C, the value of the clock stop SB priority cancelling flag is "1". When the start command is issued, the AND gate G26 outputs "1". Thus, "1" is set to the flip-flop FF27.

The flag representing cycle counter value "odd number" in clock stop SB priority cancelling state is constructed of the circuit shown in FIG. 8D. Since the count value "5" has been set, the value of the flag representing cycle counter value "odd number" becomes "1". Since the value of the clock stop SB priority cancelling flag is "1", when the start signal (n7) becomes high "1", the AND gate G27 outputs "1". Thus, "1" is set to the flip-flop FF28.

When the count value of the cycle counter becomes "1", the cycle counter clock stop signal (n9) shown in FIG. 8C is sent to the flip-flop FF27. Thus, the flip-flop FF27 is reset and thereby the value of the clock stop SB priority cancelling copy flag becomes "0".

In FIG. 9A, since the value of the flag representing cycle counter value "1" in clock stop SB priority cancelling state is "0", the AND gate G31 outputs "0". Since the value of the clock stop SB priority cancelling flag is "1", the flag representing cycle counter value "odd number" in clock stop SB priority cancelling state is "1", the inverted signal of the clock stop S3 signal is high ("1"), the OR gate 33 outputs "0" at a timing that the clock stop S5 signal becomes "0". Thus, the clock stop SA signal becomes low ("0") one cycle of the basic period clock after the clock stop S5 signal becomes low ("0").

In FIG. 9B, since the value of the flag representing cycle counter value "odd number" in clock stop SB priority cancelling state is "1", the value of the reverse signal of the flag representing cycle counter value "1" in clock stop SB priority cancelling state is "1", the value of the clock stop SB priority cancelling flag is "1", and the clock stop SB signal is high ("1"), the AND gate G36 outputs "0" at a timing at which the clock stop S4 signal becomes low ("0"). In addition, the OR gate G37 outputs "0" at the same timing. Thus, the clock stop SB signal becomes low one clock cycle of the basic period clock signal after the clock stop S4 signal becomes low "0").

When the clock stop S4 signal is low ("0") and the clock stop S5 signal is high ("1"), the flag representing the cycle counter value "odd number" in the clock stop SB priority cancelling state is reset (namely, the value of this flag becomes "0").

In addition, the value of the clock stop SB priority cancelling flag becomes "0" at the same timing.

Since the clock stop SB signal becomes low, the basic clock signal is supplied as the clock signal (n20). The clock signal (n5) is supplied 10 ns after the clock signal (n20) is supplied. In addition, since the clock stop SA signal becomes low, the clock signal (n19) is supplied one cycle (20 ns) after the clock signal (n20) is supplied. At the same timing, the clock signal (n5) is also supplied.

When the value of the cycle counter FF13 which performs the decremental operation becomes "1", the decoder DEC detects this value and sends it to the clock stop detecting circuit 13. The clock stop detecting circuit 13 generates the clock stop signal (n9). With the stop signal, the clock stop flip-flop FF1 is set. The output signal of the flip-flop FF1 is sent to the shift register in the clock stop delay portion 15. The output signal is successively shifted in the shift register.

Since the value of the clock stop SB priority cancelling flag is "0", the AND gates G31 and G32 output "0". Thus, the OR gate G33 sends the clock stop S4 signal to the flip-flop FF11. Thus, the clock stop SA signal becomes high ("1") one clock cycle of the basic period clock signal after the clock stop S4 signal becomes high.

Since the value of the clock stop SB priority cancelling flag is "0", the AND gates G35 and G36 output "0". Thus, the OR gate G37 sends the clock stop S4 signal to the flip-flop FF12. Thus, the clock stop SB signal becomes "1" one clock cycle of the basic period clock signal after the clock stop S4 signal becomes high.

The clock signal (n19) is suppressed with the clock stop SA signal. In addition, the clock signal (n20) is suppressed with the clock stop SB signal. Since the block signal (n19) is stopped, the clock signal (n3) is also stopped. The clock B signal (n5) is stopped 10 ns after the clock signal (n3) is stopped.

As described above, a clock signal consisting of five cycles which is set to the cycle counter is supplied as the clock B signal (n5). A clock signal according to the value which is set in the cycle counter can be supplied as the clock B signal (n5). In the description of the embodiment, line delays caused between each circuit are not considered. In a unit to be tested, if the phase is an important factor, by considering the line delays, the present invention can be applied.

Figure 1:
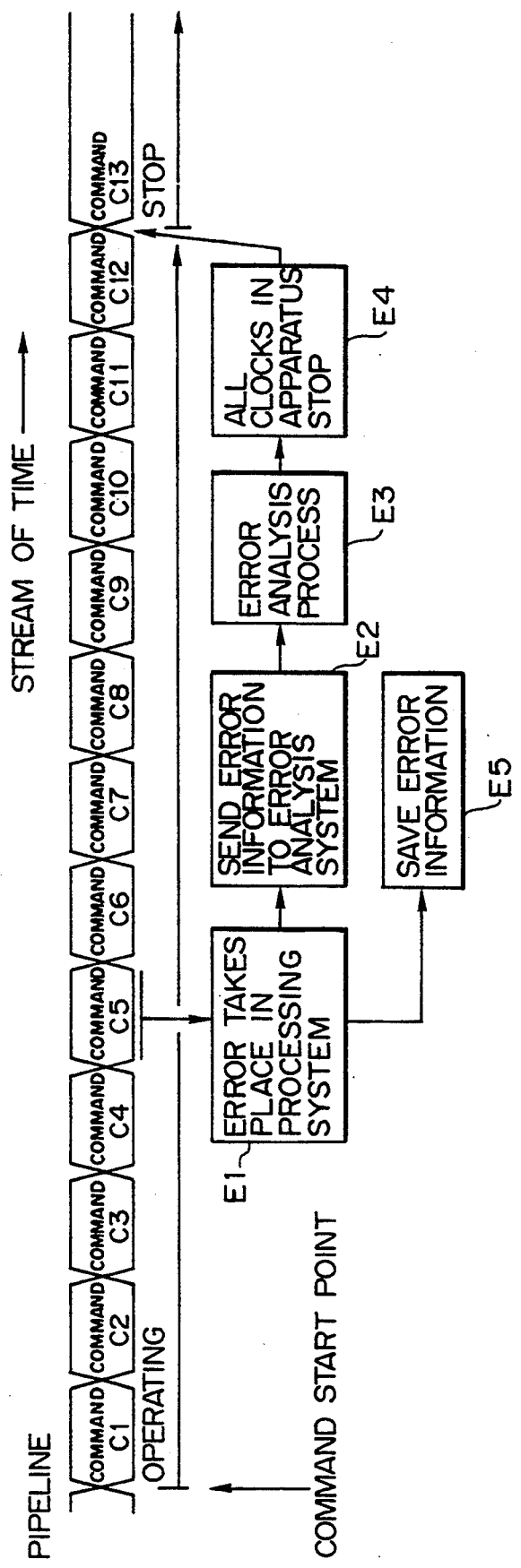
FIG. 1 is a schematic diagram for explaining the operation of a pipeline processing unit.
Figure 2:
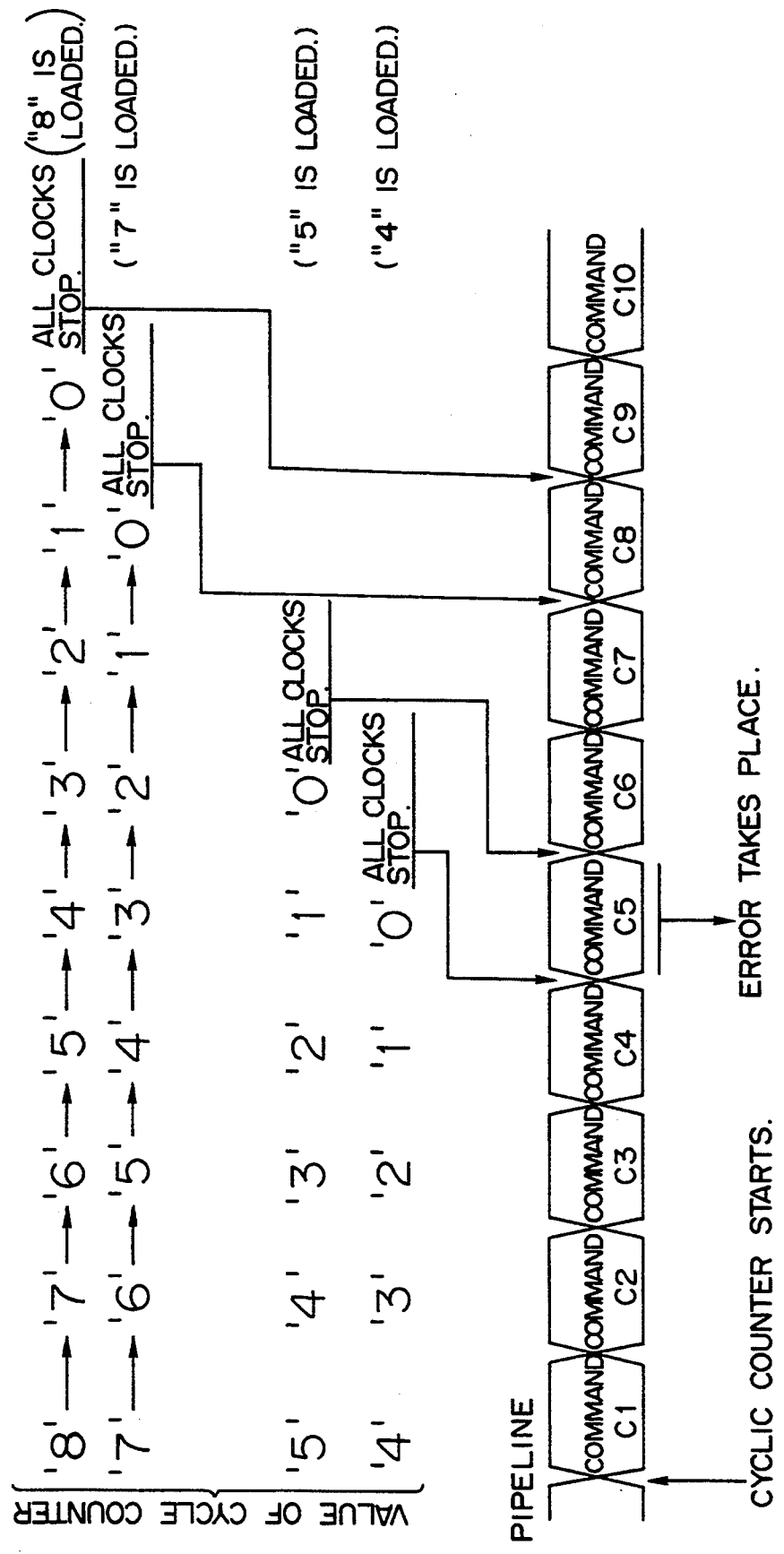
FIG. 2 is a schematic diagram for explaining a cycle counter.
Figure 3:
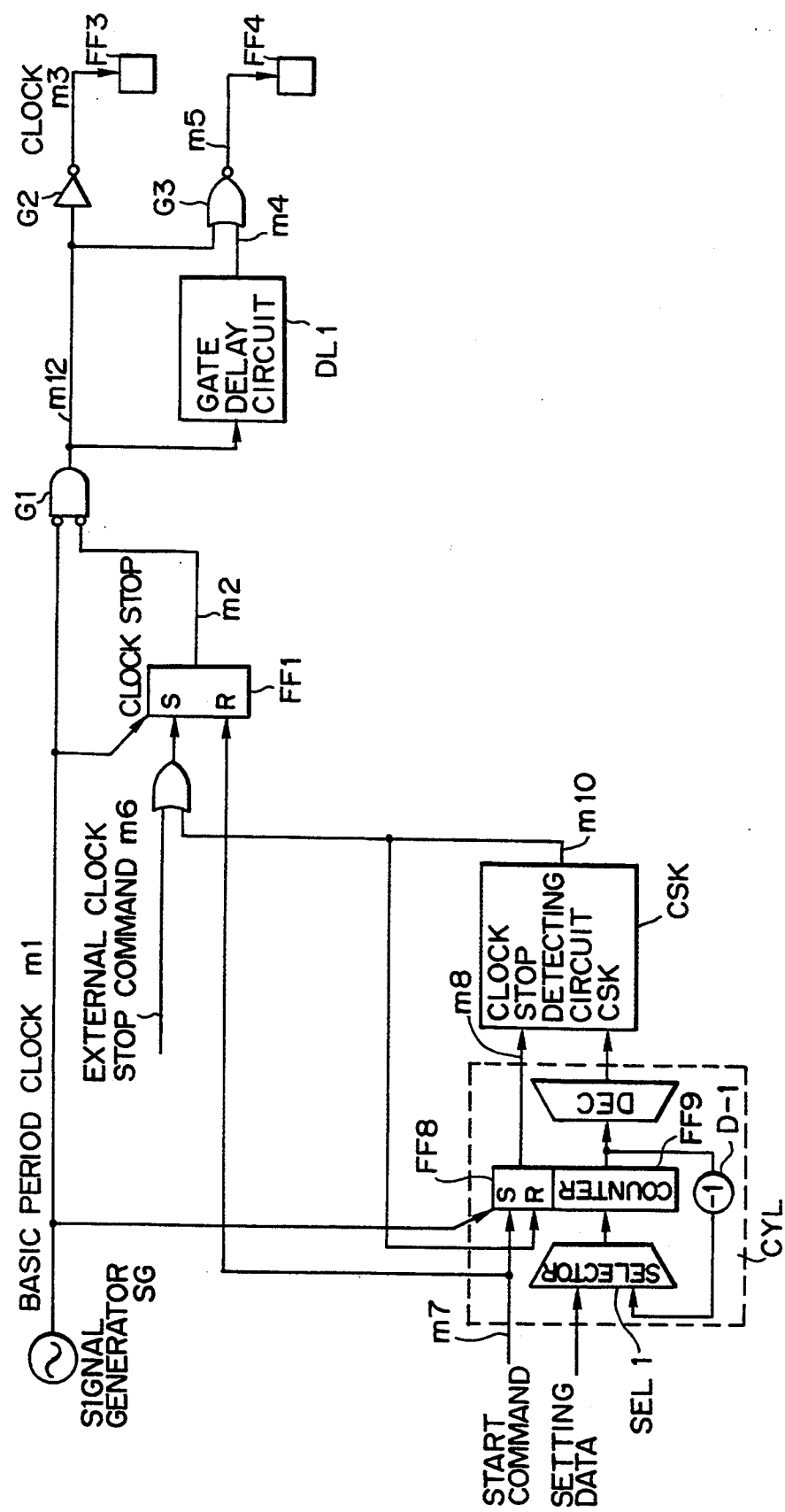
FIG. 3 is a circuit diagram showing the construction of a clock control circuit.
Figure 4:
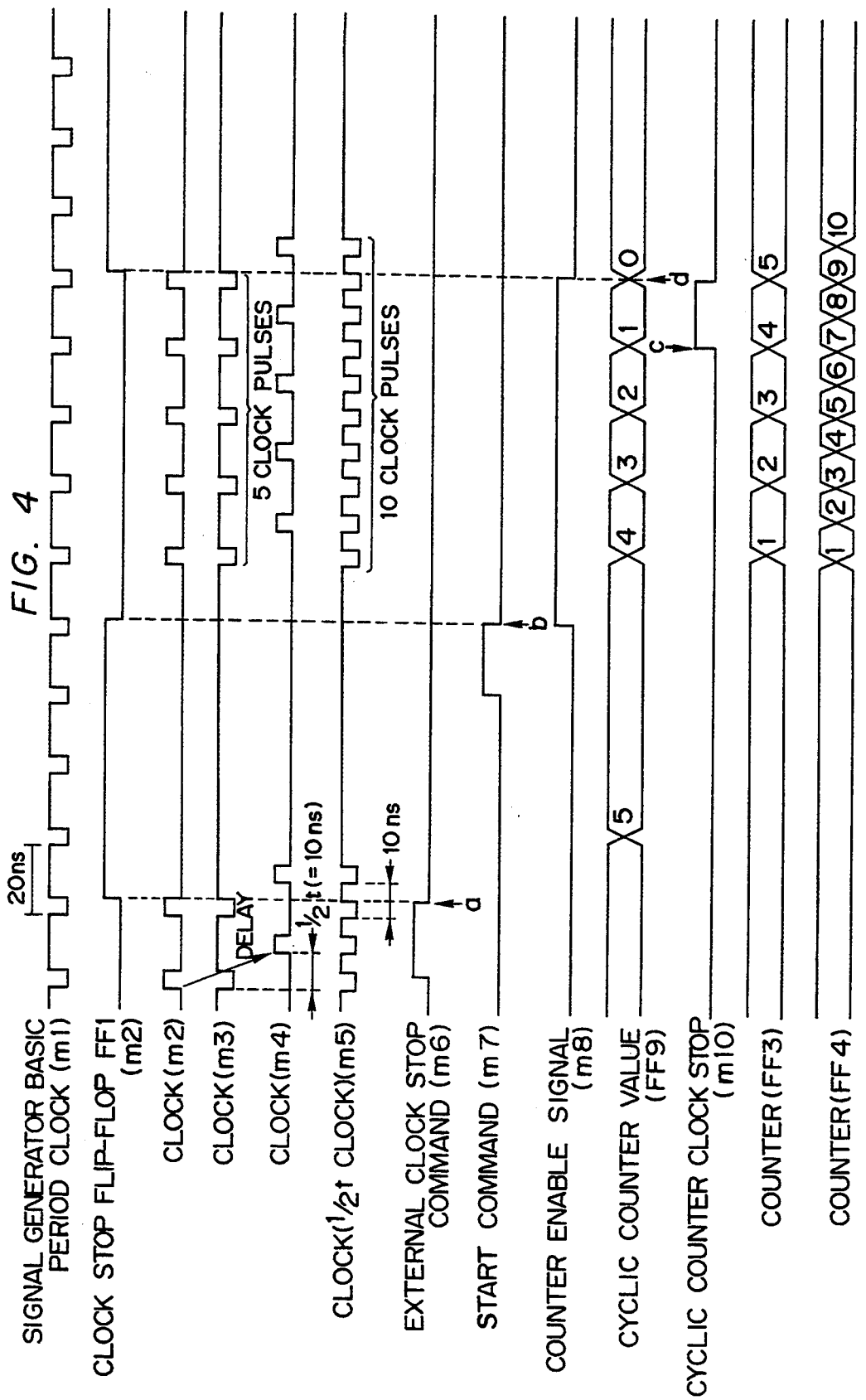
FIG. 4 is a timing chart of signals used in the clock control circuit.

As well as the operations corresponding to the timing charts shown in FIGS. 4 and 5, the embodiment of the present invention may be applied in various conditions. For example, with the external clock stop signal (n6), the clock A signal (n3) and then the clock signal B (n5) may be stopped. In restart state, the value of the clock stop SB priority cancelling flag may be "1". With the external clock stop signal, both the clock A signal (n3) and the clock B signal (n5) may be stopped at the same time. In restart state, the clock stop SB priority cancelling flag may be "0".

Next, the detail setting conditions of the clock stop SA flip-flop FF11 and the clock stop SB flip-flop FF12 in the clock stop A/B generating circuit 17-1 will be described. Thereafter, the flags of the clock-phase corresponding stop control portion 16 will be described.

The clock stop SA signal and the clock stop SB signal are signals which cause the gates G10 and G11 to be turned on/off so as to supply or stop the basic period clock signal n1 therefrom as the clock signal (n19) and the clock signal (n20), respectively.

The clock A/B generating circuit 17-1 sets the clock stop SA flip-flop FF11 in the following conditions.

(Setting conditions of the clock stop SA flip-flop FF11)

Clock stop S4 signal+Clock stop SB priority cancelling flag×Clock stop S3 signal×Clock stop S5 signal×Flag representing cycle counter value "1" in clock stop SB priority cancelling state×Clock stop SA signal+Clock stop SB priority cancelling flag×$\overline{\text{Clock stop S3 signal}}$×Clock stop S5 signal×Flag representing cycle counter value "odd number" in clock stop SB priority cancelling state×$\overline{\text{Flag representing cycle counter value "1" in clock stop SB priority cancelling state}}$×Clock stop SA signal The clock stop flip-flop FF12 is set in the following conditions.

(Setting conditions of clock stop SA flip-flop FF12)

Clock stop SB priority canceling flag×Clock stop S4 signal+Clock stop SB priority cancelling flag×Clock stop S3 signal+ Clock stop SB priority cancelling flag×$\overline{\text{Clock stop S2 signal}}$×Clock stop S4 signal×Flag representing cycle counter value "odd number" in clock stop SB priority cancelling state×$\overline{\text{Flag representing cycle counter value "1" in clock stop SB priority cancelling state}}$×Clock stop SB signal The clock stop SL signal (where L=1 to 5) is a signal which is output from the shift register in the clock stop delay portion 15. The value of the cycle counter in the clock stop SB priority cancelling state is a signal which is output from the clock-phase corresponding stop control portion 16. This signal is a flag representing the value of the cycle counter in the clock stop SB priority cancelling state.

Next, each flag of the clock-phase corresponding stop control portion 16 will be described.

The clock stop SB priority cancelling setting notice flag serves to control a setting timing (phase relation) of high ("1") states of the clock stop SA signal and the clock stop SB signal when the cycle counter of the t/N cycle counter control portion 12 becomes zero and stops. The value of this flag varies corresponding to the content of the clock stop SB priority cancelling copy flag which stores the phase relation of the low ("0") states of the clock stop SA signal and the clock stop SB signal in the cycle counter start state. With the clock stop B priority cancelling setting notice flag, the state of the clock stop SB priority cancelling flag is controlled so as to determine the high ("1") states of the clock stop SA signal and the clock stop SB signal.

(Setting conditions of clock stop SB priority cancelling setting notice flag)

$\overline{\text{Cycle counter clock stop}}$×$\overline{\text{Clock stop SB priority cancelling copy flag}}$×Cycle counter value "1"+Cycle counter clock stop×Clock stop SB priority cancelling copy flag×Cycle counter value "2"

(Cancelling condition of clock stop SB priority cancelling setting notice flag)

Clock stop S2 signal

The clock stop SB signal serves to command a priority cancellation. The clock stop SB priority cancelling flag has two function. As the first function, when both the clock stop SA signal and the clock stop SB signal are high ("1") (namely, clock signals are stopped), the clock stop SB priority cancelling flag identifies whether to cancel both the clock stop SA signal and the clock stop SB signal at the same time or to cancel the clock stop SB signal and then the clock stop SA signal with a delay of one cycle so as to supply clock signals. As the second function, when both the clock stop SA signal and the clock stop SB signal are low (namely, clock signals are supplied), the clock stop SB priority cancelling flag identifies whether to set both the clock stop SA signal and the clock stop SB signal at the same time or to set the clock stop SB signal and then the clock stop SA signal with a delay of one cycle so as to stop the supplies of the clock signals. The clock stop SB priority cancelling flag can be set externally for example with a command issued by the user.

(Setting conditions of clock stop SB priority cancelling flag)

Clock stop S2 signal×Clock stop SB priority cancelling setting notice flag+External command for setting clock stop SB priority cancellation (Cancelling conditions of clock stop SB priority cancelling flag)

Clock stop S4 signal×Clock stop S5 signal×Flag representing cycle counter value "odd number" in clock stop SB priority cancelling state The clock stop B signal priority cancelling copy flag stores the phase relation of low states of the clock stop SA signal and the clock stop SB signal when the t/N cycle counter control portion 12 is started. In other words, in the condition, the clock stop B signal priority cancelling copy flag identifies whether or not to cancel both the clock stop SA signal and the clock stop SB signal at the same time or to cancel the clock stop SB signal and then the clock stop SA signal with a delay of one cycle. In the case that a large value is set to the cycle counter in the t/N cycle counter control portion 12, when the clock stop S5 signal becomes low ("0"), the clock stop SB priority cancelling flag becomes low ("0"). Thereafter, the cycle counter in the t/N cycle counter control portion 12 repeats the decremental operation. When the value of the cycle counter becomes zero, it stops the decremental operation. Thus, the value of the clock stop FF becomes "1".

(Setting conditions of clock stop SB priority cancelling copy flag)

Start signal n7×Clock stop SB priority cancelling flag (Cancelling condition of clock stop SB priority cancelling copy flag)

Cycle counter clock stop (Setting conditions of flag representing cycle counter value "odd number" in clock stop SB priority cancelling state)

Start signal n7×Clock stop SB priority cancelling flag×Cycle counter value "odd number"

(Cancelling conditions of flag representing cycle counter value "odd number" in clock stop SB priority cancelling state)

$\overline{\text{Clock stop S4 signal}} \times \text{Clock stop S5 signal}$ (Setting conditions of flag representing cycle counter value "1" in clock stop SB priority cancelling state)

Start signal n7×Clock stop SB priority cancelling flag×Cycle counter value "1"

(Cancelling conditions of flag representing cycle counter value "1" in clock stop SB priority cancelling state)

$\overline{\text{Clock stop S4 signal}} \times \text{Clock stop S5 signal}$

Since the above-described flags are used in the clock-phase corresponding stop control portion 16, the clock-phase corresponding stop generating portion 17 sets the clock stop SA signal and the clock stop SB signal according to the values of the flags, a t/N period clock signal produced with the basic period clock signal can be stopped at any odd number.

Without the above-described clock stop B signal priority cancelling copy flag, a t/N period clock signal can be generated only with the clock stop B signal priority cancelling setting notice flag.

(Setting conditions of flag)

Start signal n7×$\overline{\text{Clock stop SB priority cancelling copy flag}}$×Cycle counter value "odd number"+Start signal n7×Clock stop B priority cancelling copy flag×Cycle counter value "even number" flag (Canceling condition of flag)

Clock stop S2 signal

The embodiment of the present invention has been described in detail. However, the present invention is not limited to the above-descried embodiment. For example, in the embodiment, the clock A signal (n3) and the clock B signal (n5) generates negative clock signals (namely, when the clocks stop, the signals levels thereof become high ("1")). However, the clock A signal (n3) and clock B signal (n5) may generate positive clock signals. This may apply to the polarities of internal flags.

In the embodiment, the number of the t/N delay period clock enabling portion 19 is one. In addition, the value of N is 2. However, for example, the value of N may be 3 or more. Moreover, with a plurality of t/N delay period clock enabling portions, they may have different delays. When the number of t/N delay period clock enabling portions is m (where m is 1 to N−1), up to N frequency times higher than a basic clock signal may be generated.

Figure 11A:
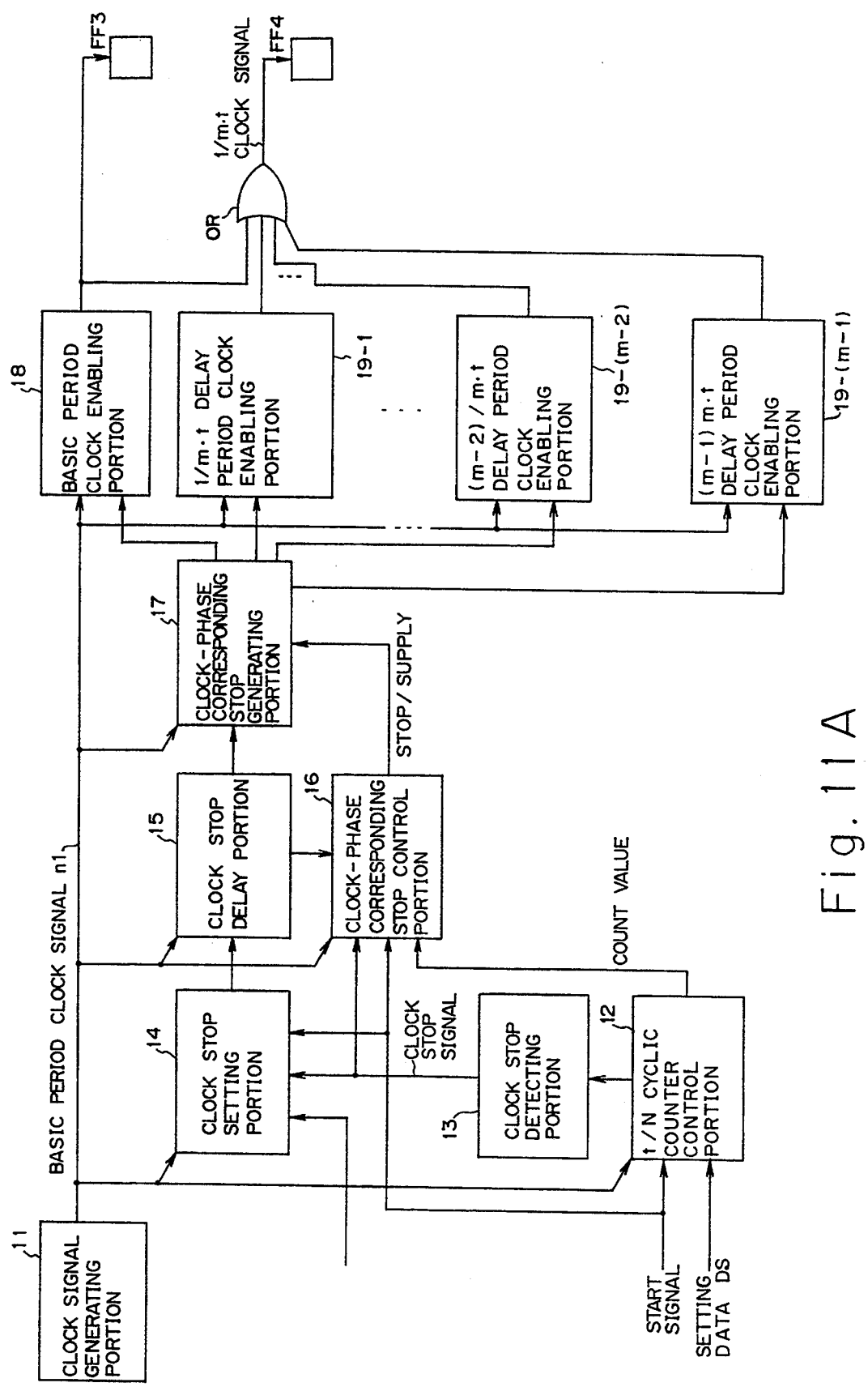
FIGS. 11A and 11B show the configuration of the embodiment where N=m.

FIG. 11A shows an embodiment Where N=m (m=1∼N−1). In this case, m−1 units of the delay period clock enabling portions 19 are required. Assuming that a delay period clock enabling portion is an (m−i)/m·t delay period clock enabling unit, it further delays a clock by 1/m·t compared with the (m−i−1)/m·t (i indicates a value within the range of 1∼m−1).

The outputs of the basic period clock enabling portion 18 and the 1/m·t delay period clock enabling portion∼(m−1)/m·t delay period clock enabling portion are ORed at the OR gate for the input of m, and are outputted as a a/m·t period clock.

Figure 11B:
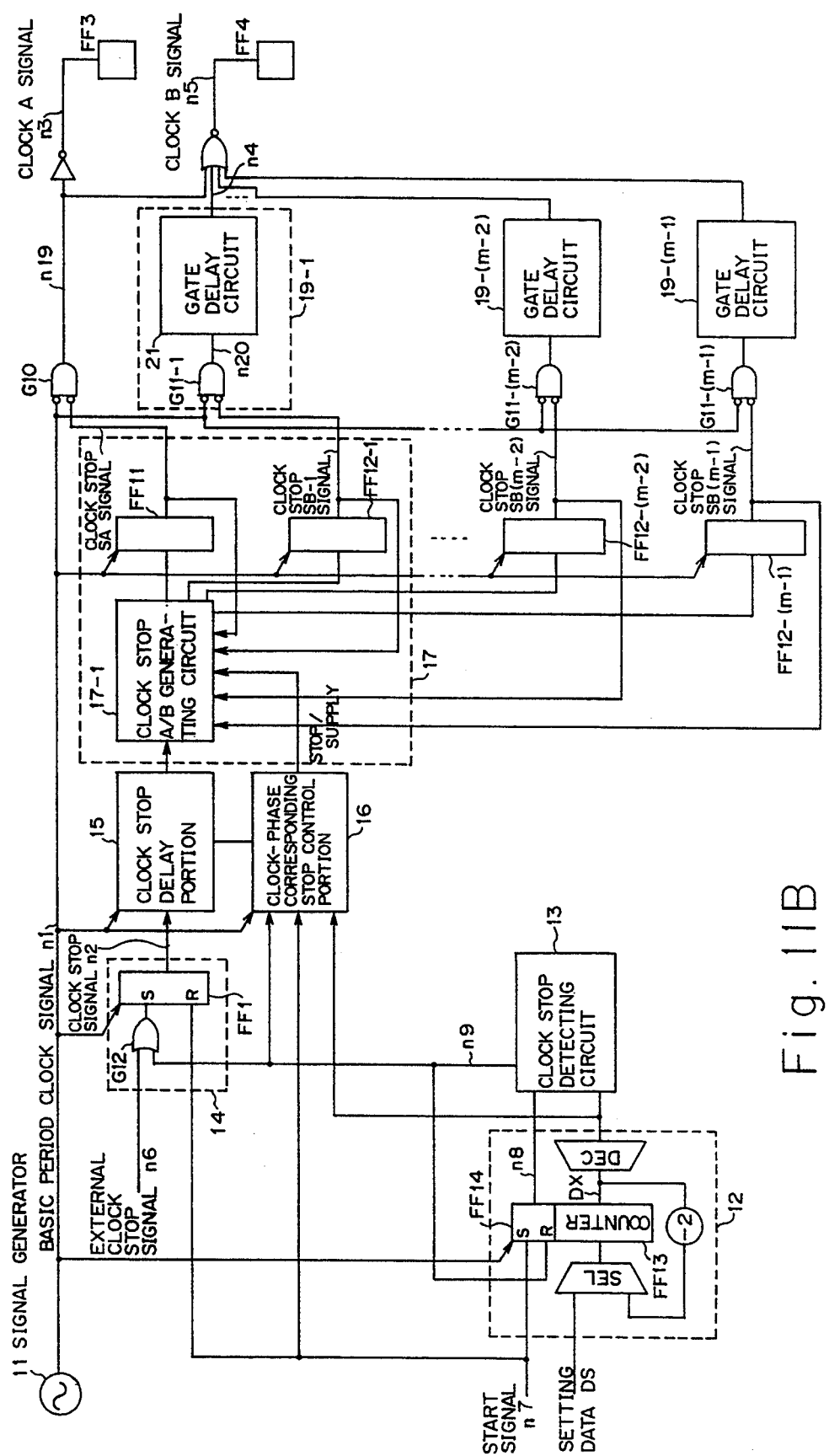

FIG. 11B shows the embodiment shown in FIG. 11A in detail. In this case, (m−1) clock stop SB signals (shown in FIG. 6B) are required. They are clock stop SB1 signals∼clock stop SB (m−1) signals, and are outputted from flipflops FF12-1∼FF12-(m−1) respectively. An input signal to each of the flipflops FF12-1∼FF12-(m−1) is generated according to a flag written to clock stop A/B generating circuit 17-1.

Each of the clock stop SB1 signals∼clock stop SB (m−1) signals is applied to OR gates G11-1∼G11-(m−1) respectively, and each output is applied to gate delay circuits 19-1∼19-(m−1) respectively. Then, each of the outputs is applied to a NOR gate for the input of m, and outputted as a 1/m·t period clock and applied to FF4.

In this case, as signals which are output from the clock-phase corresponding stop generating portion 17, flags corresponding to the number of clock enabling portions 19 are required. In addition, the number of t/N delay enabling period signals should accord with the number of phases being divided. For example, in FIG. 11A, when a ⅓t period clock signal is supplied to the FF4, the clock-phase corresponding stop generating portion 17 outputs three signals which are a ⅓t delay enable period signal corresponding to a ⅓t delay period clock signal, a ⅔t delay enable period signal corresponding to a ⅔t delay period clock signal, and a basic enable period signal corresponding to the basic period clock signal. After the basic period clock signal of the clock signal generating portion is gated with these three enable period signals, signals gated by the two delay enable period signals are input to delay circuits which delay signals.

The clock supply enable signals which are output from the two delay circuits and the clock supply enable signal for the basic period clock are ORed and then supplied to the FF4. Thus, a ⅓t period clock signal is supplied.

By a combination of the embodiment of the present invention and the related art, for example, by inputting a mode signal from the outside of the apparatus so as to separately perform cycle counter controls corresponding to the basic period and the t/N period, a unit can be more effectively tested. In addition, when a cycle counter counts according to each mode, the circuit scale can be reduced.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A clock control apparatus having a basic period clock (t) and a plurality of clocks with different phases from said basic period clock by t/N period, for use with an information processing unit, said apparatus comprising:

a clock signal generating means for generating pulses of said basic period clock;

a cycle counter for counting the number of pulses of said basic period clock received from said clock signal generating means when a start command is received and for outputting a cycle counter clock stop signal when the number of pulses becomes a predetermined count value;

a control means for outputting a basic enable period signal for controlling said basic period clock and a delay enable period signal for controlling said t/N period clocks by a flag and said cycle counter clock stop signal, said flag being pre-assignable before said start command is received;

a basic period clock enabling means for receiving pulses of said basic period clock and for outputting the pulses of said basic period clock for a period designated by said basic enable period signal; and a t/N delay period clock enabling means for generating pulses of said t/N period clocks and for outputting the pulses for a period designated by said delay enable period signal.

2. The apparatus as set forth in claim 1, wherein said cycle counter is adapted to automatically stop when the count value thereof becomes "0".

3. The apparatus as set forth in claim 1, wherein said cycle counter comprises a counter for decrementing a predetermined value by N corresponding to the number of pulses of said basic period clock received from said clock generating means.

4. The apparatus as set forth in claim 1, wherein said cycle counter comprises a clock control circuit for decrementing a predetermined value by N corresponding to the number of pulses of said basic period clock received from said clock generating means and for outputting said cycle counter clock stop signal when the count value becomes a value in the range from 1 to N.

5. The apparatus as set forth in claim 1, wherein said cycle counter comprises a counter for incrementing a predetermined value by N corresponding to the number of pulses of said basic period clock received from said clock generating means.

6. The apparatus as set forth in claim 1, wherein said control means comprises a clock stop setting means for generating a clock stop signal, said clock stop signal being enabled by an external stop command, the enable of said clock stop signal being disabled by a start request, said disable being enabled by said cycle counter clock stop signal received from said cycle counter.

7. The apparatus as set forth in claim 1, wherein said control means comprises a clock stop delay means for shifting said clock stop signal by pulses of said basic period clock.

8. The apparatus as set forth in claim 1, wherein when the count value of said cycle counter is an odd number and the value of said flag is "1", said control means being adapted to enable said delay enable period signal and then said basic enable period signal with a delay of one clock cycle and to disable both said basic enable period signal and said delay enable period signal at the same time after said cycle counter clock stop signal is received from said cycle counter; and wherein when the count value of said cycle counter is an odd number and the value of said flag is "0", said control means being adapted to enable both said basic enable period signal and said delay enable period signal at the same time and to disable said delay enable period signal and then said basic enable period signal with a delay of one clock cycle after said cycle counter stop signal is received from said cycle counter.

9. The apparatus as set forth in claim 1, wherein when the count value of said cycle counter is an even number and the value of said flag is "1", said control means being adapted to enable said delay enable period signal and then said basic enable period signal with a delay of one clock cycle and to disable said delay enable period signal and then said basic enable period signal with a delay of one clock cycle after said cycle counter clock stop signal is received from said cycle Counter; and wherein when the count value of said cycle counter is an even number and the value of said flag is "0", said control means being adapted to enable both said basic enable period signal and said delay enable period signal at the same time and to disable both said delay enable period signal and said basic enable period signal at the same time after said cycle counter clock stop signal is received from said cycle counter.

10. The apparatus as set forth in claim 1, wherein said control means comprises:

a clock stop A/B generating circuit for determining conditions of generating said basic enable period signal and said delay enable period signal; and flip-flops for temporarily storing the determined results of said clock stop A/B generating circuit;

wherein when determined results for enabling said basic enable period signal are received from said clock stop generating circuit, said flip-flop is adapted to store said results and to output said basic enable period signal; and wherein when determined results for enabling said delay enable period signal are received from said clock stop generating circuit, said flip-flop is adapted to store said results and to output said delay enable period signal.

11. The apparatus as set forth in claim 1, wherein said basic period clock enabling means is adapted to OR a signal of said basic period clock and said basic enable period signal and to output the resultant signal.

12. The apparatus as set forth in claim 1, wherein said t/N delay period clock enabling means is adapted to OR a pulse of said basic period clock and said deldelay enable period signal so as to control said clock.

13. The apparatus as set forth in claim 1, wherein said t/N delay period clock enabling means is adapted to OR a pulse of said basic period clock and said delay enable period signal and to delay the ORed result by a delay line.

14. The apparatus as set forth in claim 1, further comprising a gate circuit for ORing the output of said basic period clock enabling means and the output of said t/N delay period clock enabling means and for outputting a clock signal with twice higher period than said basic period clock.

15. The apparatus as set forth in claim 1, further comprising a gate circuit for ORing the output of said basic period clock enabling means and the output of said t/N delay period clock enabling means and for outputting a clock signal with n (where n is any integer) times higher period than said basic period clock.

16. The apparatus as set forth in claim 1, wherein said t/N delay period clock enabling means is adapted to perform a t/2 delay operation.

17. The apparatus as set forth in claim 1, wherein said t/N delay period clock enabling means is adapted to generate output signals with a plurality of phases with delays of Mt/N period (where M is any number).

* * * * *

UNITED STATES PATENT AND TRADEMARK OFFICE
CERTIFICATE OF CORRECTION

PATENT NO. : 5,390,224
DATED : February 14, 1995
INVENTOR(S) : Komatsuda

It is certified that error appears in the above-indentified patent and that said Letters Patent is hereby corrected as shown below:

Col. 2, line 59, delete "m3" and insert --m5--.

Col. 11, line 6, delete "(n3)" and insert --(n5)-- line 58, delete ".".

line 67, delete "(n3)" and insert --(n5)--.

Col. 16, line 21, insert --(-- after "low".

line 35, delete "(n5)" and insert --(n3)--.

Col. 22, line 43, delete "deldelay" and insert --delay--.

Signed and Sealed this

Fourth Day of July, 1995

Attest:

BRUCE LEHMAN

Attesting Officer      Commissioner of Patents and Trademarks